US012255413B2

(12) United States Patent
Kitamura et al.

(10) Patent No.: US 12,255,413 B2
(45) Date of Patent: Mar. 18, 2025

(54) BOARD MOUNTED CONNECTOR WITH TERMINALS ARRANGED BY LENGTH

(71) Applicants: JAPAN AVIATION ELECTRONICS INDUSTRY, LIMITED, Tokyo (JP); TOYOTA JIDOSHA KABUSHIKI KAISHA, Toyota (JP)

(72) Inventors: Shigeyasu Kitamura, Tokyo (JP); Toshihiro Oka, Tokyo (JP); Youichi Suzuki, Toyota (JP)

(73) Assignees: JAPAN AVIATION ELECTRONICS INDUSTRY, LIMITED, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 17/897,658

(22) Filed: Aug. 29, 2022

(65) Prior Publication Data

US 2023/0074315 A1 Mar. 9, 2023

(30) Foreign Application Priority Data

Sep. 6, 2021 (JP) ................................ 2021-144793

(51) Int. Cl.
*H01R 12/57* (2011.01)
*H01R 13/04* (2006.01)
(Continued)

(52) U.S. Cl.
CPC ............. *H01R 12/57* (2013.01); *H01R 13/04* (2013.01); *H01R 13/50* (2013.01); *H01R 13/6581* (2013.01)

(58) Field of Classification Search
CPC ..... H01R 12/57; H01R 13/04; H01R 13/6581
See application file for complete search history.

(56) References Cited

U.S. PATENT DOCUMENTS 9,627,796 B2 * 4/2017 Tsai .................. H01R 13/5216
2015/0311653 A1 10/2015 Ota et al.
(Continued)

FOREIGN PATENT DOCUMENTS

JP H07-085932 A 3/1995
JP 2000-091002 A 3/2000
(Continued)

OTHER PUBLICATIONS

Japan Patent Office, "Office Action for Japanese Patent Application No. 2021-144793," Aug. 15, 2023.

*Primary Examiner* — Vanessa Girardi
(74) *Attorney, Agent, or Firm* — Kreative IP Management LLC; Fuiyeong Kim

(57) ABSTRACT

In a connector having a housing and a plurality of terminals, the plurality of terminals is configured as surface mount terminals, and each surface mount terminal includes a terminal portion arranged inside the housing, a fixed portion fixed to the housing, and a mount portion soldered to a mount surface of a board. The surface mount terminals are arranged side by side from one side to the other side in a Y-direction when the connector mounted on the mount surface is viewed in an X-direction, and a surface mount terminal having the smallest length dimension from the mount portion to the fixed portion is arranged at the leftmost end in the Y-direction, and the length dimension from the mount portion to the fixed portion is larger or the same dimension according to the arrangement order from the left side to the right side in the Y-direction.

7 Claims, 27 Drawing Sheets

(51) Int. Cl.
*H01R 13/50* (2006.01)
*H01R 13/6581* (2011.01)

(56) References Cited

U.S. PATENT DOCUMENTS

| | | | | |
|---|---|---|---|---|
| 2020/0194915 | A1* | 6/2020 | Kawashima ........... | H01R 12/57 |
| 2021/0104830 | A1 | 4/2021 | Kawashima et al. | |

FOREIGN PATENT DOCUMENTS

| | | | |
|---|---|---|---|
| JP | 2007-123165 | A | 5/2007 |
| JP | 2015-210899 | A | 11/2015 |
| JP | 2021-114378 | A | 8/2021 |
| WO | 2018/198732 | A1 | 11/2018 |

* cited by examiner

BOARD MOUNTED CONNECTOR WITH TERMINALS ARRANGED BY LENGTH

CROSS-REFERENCE TO RELATED APPLICATION

The present application is based on and claims priority from Japanese Patent Application No. 2021-144793 filed on Sep. 6, 2021, the disclosure of which is hereby incorporated by reference herein in its entirety.

BACKGROUND OF THE INVENTION

Field of the Invention

The present invention relates to a connector.

Description of the Related Art

A surface mount type connector has been known which has a housing formed of resin and a plurality of metal terminals installed in the housing and is installed on a mount surface of a board for use. For example, Japanese Patent Laid-Open No. 2015-210899 (hereinafter referred to as Patent Literature 1) discloses a surface mount type connector, a plurality of terminals of which are all configured as surface mount terminals to be soldered to electrically conductive pad portions formed on a mount surface of a board as shown in FIG. 27.

Conventional connectors represented by the connector disclosed in Patent Literature 1 are configured so that a plurality of surface mount terminals formed of metal are arranged in a housing formed of resin, which causes a phenomenon in which mount portions of the surface mount terminals are lifted up from the mount surface of a board due to thermal expansion of the housing in a reflow soldering process. This phenomenon occurs because the resin housing has a larger thermal expansion coefficient than the metal surface mount terminals.

In the conventional connectors, in a case where all surface mount terminals have the same shape, specifically, the length dimensions from the fixed portions of the surface mount terminals to be fixed to the housing to the mount portions of the surface mount terminals to be soldered to the board are equal to one another, even when the mount portions of the surface mount terminal are lifted up from the board due to the thermal expansion of the housing caused by thermal effect during soldering, the coplanarity (flatness) is maintained, so that no problem occurs.

However, in a case where a plurality of surface mount terminals having different length dimensions from the fixed portions thereof to be fixed to the housing to the mount portions thereof to be soldered to the board coexist as in the case of the connector disclosed in Patent Literature 1, as the fixed portions are located at higher positions from the board surface, the effect of the thermal expansion of the housing is greater. In other words, in the conventional connector shown in FIG. 27, the lift-up amount of the mount portion differs depending on the height of the fixed portion of the surface mount terminal due to the thermal effect during soldering, and the coplanarity deteriorates (the height of the mount portion fluctuates), which has caused a problem that soldering failure is likely to occur.

Therefore, an object of the present invention is to provide a connector whose surface mount terminals can be stably mounted on a board by reducing the amount of the lift-up of the mount portions from a board caused by a thermal effect during soldering even when a plurality of surface mount terminals having different length dimensions from the fixed portions thereof to be fixed to the housing to the mount portions thereof to be soldered to the board coexist.

SUMMARY OF THE INVENTION

A connector according to the present invention comprises: a housing formed of resin; and a plurality of terminals formed of metal to be installed in the housing, the connector being mounted on a mount surface of a board, and the mount surface of the board being parallel to a plane defined by a first direction and a second direction which are orthogonal to each other, wherein some or all of the plurality of terminals are configured as a plurality of surface mount terminals, and each of the plurality of mount terminals includes a terminal portion to be arranged inside the housing, a fixed portion to be fixed to the housing, and a mount portion to be soldered to an electrically conductive pad portion formed on the mount surface of the board, and wherein the plurality of surface mount terminals are arranged from one side to the other side in the second direction when the connector mounted on the mount surface of the board is viewed in the first direction, a surface mount terminal having a smallest length dimension from the mount portion to the fixed portion among the plurality of surface mount terminals is arranged at an outermost end on one side in the second direction, and a length dimension from the mount portion to the fixed portion is larger or the same dimension according to an arrangement order from one side to the other side in the second direction.

In other words, lift-up depending on the height of the mount portion occurs in the mount portion of the surface mount terminal during the reflow soldering process, and coplanarity deteriorates. However, the posture of the connector tends to tilt due to vibration in the reflow soldering process and the surface tension of molten solder because of the deterioration of the coplanarity. When the posture of the connector tilts, the mount portion of the surface mount terminal at the position where the height of the fixed portion is lowest serves as a fulcrum (the rotation center when tilting). In the connector according to the present invention, the surface mount terminal serving as the fulcrum is arranged at the outermost end (outer side) on one side in the arrangement direction. Therefore, the tilt of the connector causes the positions of the mount portions of all of the surface mount portions to shift downward (in the direction approaching molten solder), so that the occurrence of soldering failure is suppressed. If the surface mount terminal serving as a fulcrum is not arranged at the outermost end (outer side) on one side in the arrangement direction, the positions of the mount portions of the surface mount terminals on one side of the fulcrum are lowered, whereas the positions of the mount portions of the surface mount terminals on the other side of the fulcrum are raised (get away from the molten solder), so that soldering failure is likely to occur in the surface mount terminals on the other side.

Further, in the connector of the present invention, the plurality of surface mount terminals may be arranged so that an arrangement of the plurality of surface mount terminals arranged side by side from one side to the other side in the second direction forms two or more rows when the mount surface of the board is viewed in a third direction orthogonal to the first direction and the second direction, a surface mount terminal having a smallest length dimension from the mount portion to the fixed portion in all the rows of the plurality of surface mount terminals may be arranged at an outermost end on one side in the second direction, and surface mount terminals of all the rows arranged at an outermost end on one side in the second direction may be arranged at positions which overlap each other when the connector mounted on the mount surface of the board is viewed in the first direction.

In other words, in the connector of the present invention, even when the surface mount terminals are arranged so that the arrangement of the surface mount terminals when the mount surface of the board is viewed in the third direction forms two or more rows, the surface mount terminals serving as fulcrums are arranged at positions which overlap each other when the housing is viewed in the first direction, so that the rotation center when the connector tilts is the same, and the positions of the mount portions of the surface mount terminals of all rows shift downward (in the direction approaching the molten solder).

Further, in the connector of the present invention, the plurality of terminals may include a plurality of through-hole terminals, each of the plurality of through-hole terminals may comprise a terminal portion to be arranged inside the housing, a fixed portion to be fixed to the housing, and a mount portion to be soldered in a state where the mount portion is electrically connectable to a through-hole formed on the mount surface of the board, and all terminals each having a largest length dimension from the mount portion to the fixed portion among the plurality of terminals may be set as through-hole terminals.

In other words, in the connector of the present invention, the surface mount terminals and the through-hole terminals coexist, but all of terminals whose fixed portions are located at the highest position are set as through-hole terminals, so that the heights of the fixed portions of the surface mount terminals are relatively low, and the effect of the thermal expansion of the housing is reduced.

Further, in the connector of the present invention, the surface mount terminal whose fixed portion is located just under the fixed portion of the through-hole terminal may be provided with a crank portion bent in a crank shape between the fixed portion and the mount portion of the surface mount terminal, whereby the mount portion of the surface mount terminal can be soldered to a pad portion of the board at a position which is farther away from the housing than a mount portion of the through-hole terminal.

In other words, in the connector of the present invention, the fixed portion of the surface mount terminal located just under the through-hole terminal at the highest position is inside the through-hole terminal (housing side), but the crank portion bent in a crank shape is provided between the fixed portion and the mount portion of the surface mount terminal, whereby the mount portion of the surface mount terminal can be guided to the outside, so that a visual inspection can be easily performed.

Advantageous Effect of Invention

According to the present invention, even when a plurality of surface mount terminals which are different in the length dimension from the fixed portion to be fixed to the housing to the mount portion to be soldered to the board are mixed, the amount of lift-up of the mount portion from the board due to a thermal effect during soldering is reduced, whereby it is possible to provide a connector in which occurrence of soldering failure is suppressed, and surface mount terminals are stably mounted on the board.

DETAILED DESCRIPTION OF THE PREFERRED EMBODIMENTS

Preferred embodiments for carrying out the present invention will be described hereunder with reference to the drawings. The following embodiments do not limit the invention according to each claim, and all combinations of features described in the embodiments are not essential for means for solving the problem.

First Embodiment

A connector 100 according to a first embodiment will be described with reference to FIGS. 1 to 6. In the first embodiment, a first direction, a second direction, and a third direction are defined for convenience of explanation. In the first embodiment, the first direction is a front-back direction. In the figures, the front-back direction is shown as an X-direction. In particular, the forward direction is represented by a +X direction, and the rearward direction is represented by a −X direction. Further, in the first embodiment, the second direction is a left-right direction. In the figures, the left-right direction is shown as a Y-direction. In particular, the rightward direction is represented by +Y direction, and the leftward direction is represented by −Y direction. Further, in the first embodiment, the third direction is an up-and-down direction. In the figures, the up-and-down direction is shown as a Z-direction. In particular, the upward direction is represented by +Z direction, and the downward direction is represented by −Z direction.

As shown in FIGS. 1 to 5, the connector 100 of the first embodiment includes a housing 110 formed of resin, and a plurality of surface mount terminals 120 which are a plurality of metal terminals to be installed in the housing 110. In the connector 100 of the first embodiment, all of the plurality of terminals according to the present invention are configured as surface mount terminals 120. In the first embodiment, seven surface mount terminals 120 are installed.

Figure 1:
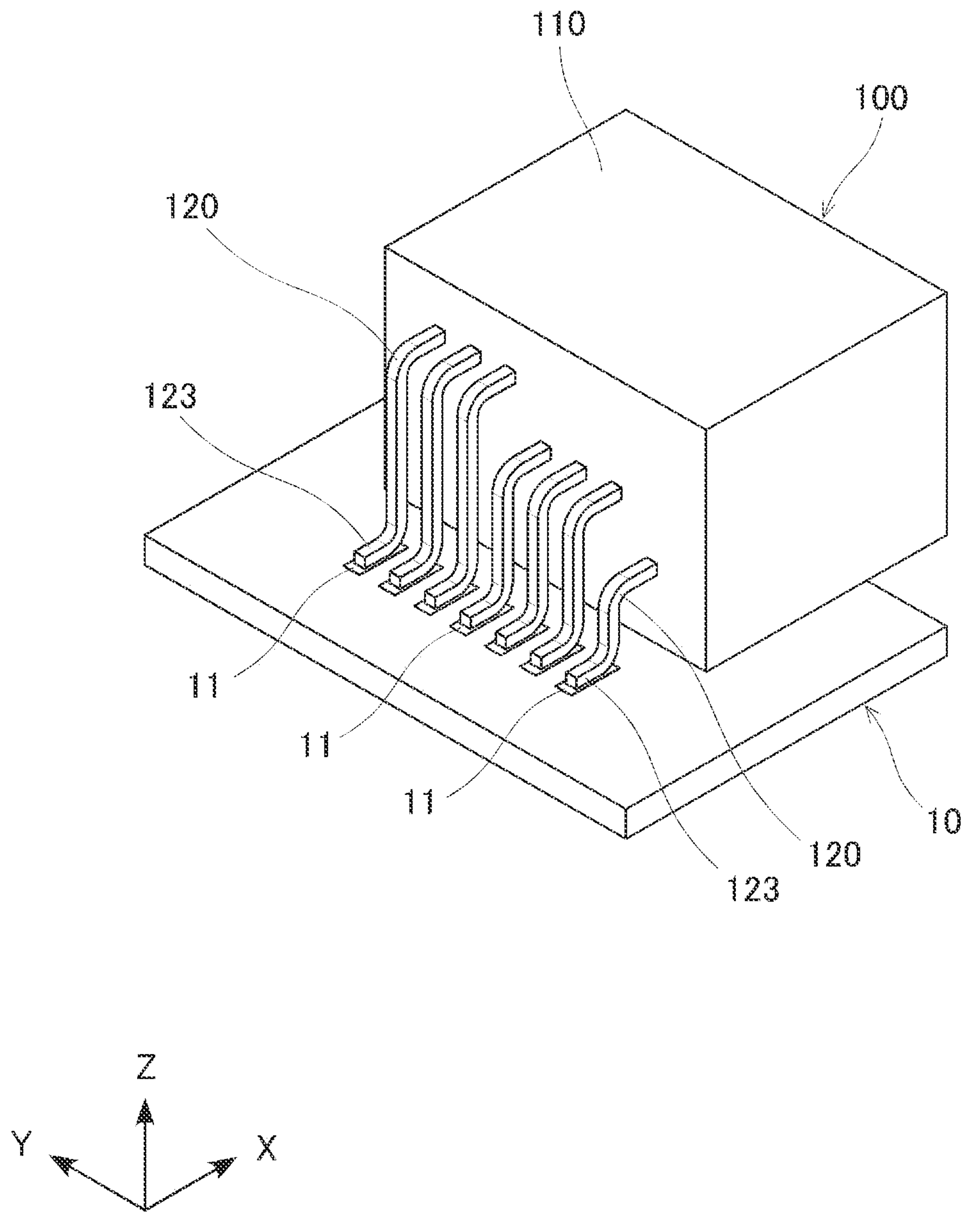
FIG. 1 is a perspective view of a connector of a first embodiment when viewed from the upper left side of a back surface thereof.
Figure 2:
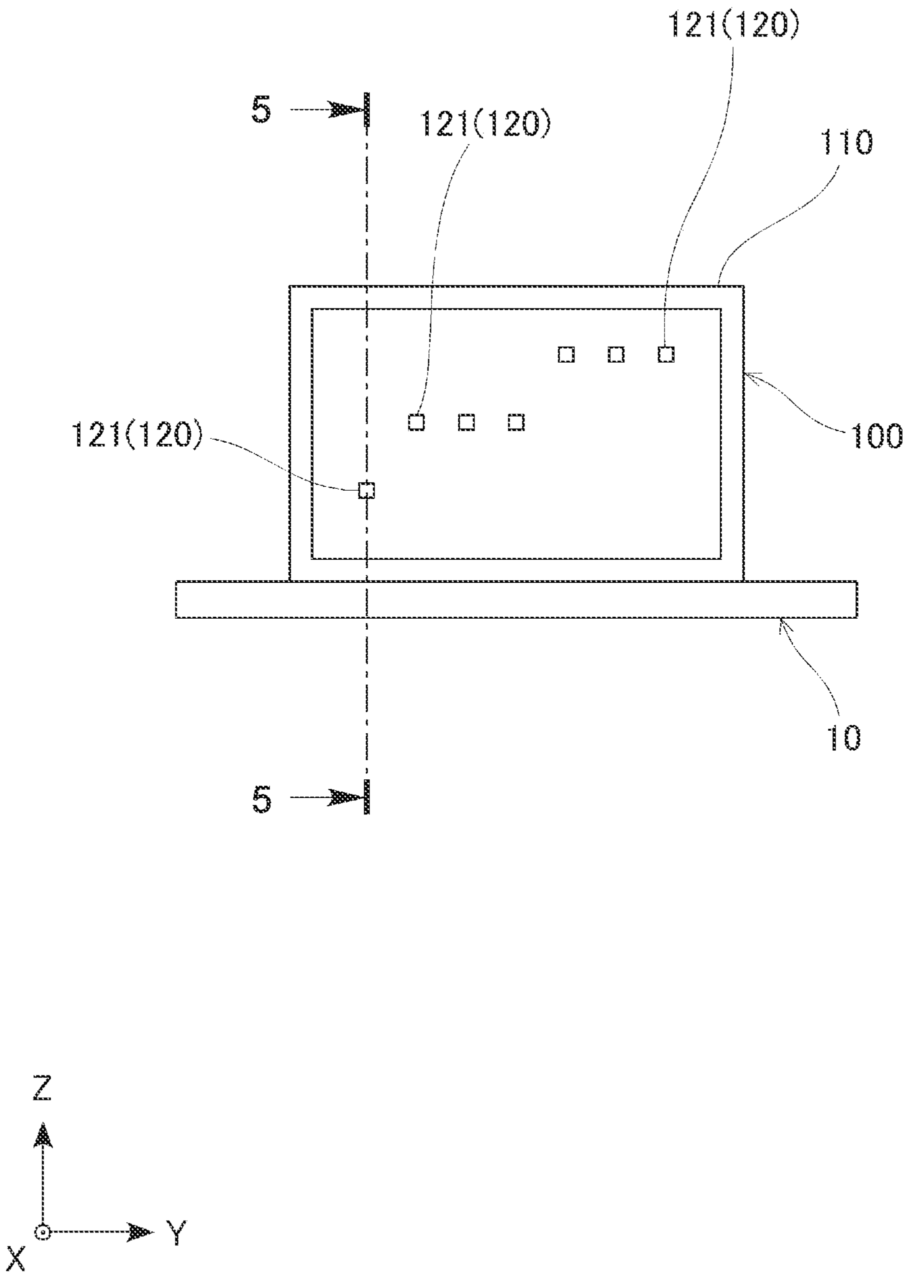
FIG. 2 is a front view of the connector of the first embodiment.

Further, as shown in FIG. 1, the connector 100 of the first embodiment is used while mounted on a mount surface of a board 10, which is parallel to an XY plane formed by the X-direction as the first direction and the Y-direction as the second direction. The board 10 of the first embodiment is, for example, a printed wiring board, and electrically conductive pad portions 11 to be soldered to seven surface mount terminals 120 are formed on the mount surface of the board 10.

With reference to FIGS. 1 to 5, in the connector 100 of the first embodiment, a mating connector (not shown) is inserted into an opening portion opened on a front side of the connector 100, whereby the connector 100 of the first embodiment and the mating connector are electrically connected to each other. Further, in the connector 100 of the first embodiment, the connector 100 and a circuit wiring of the board 10 can be connected to each other via the electrically conductive pad portions 11 formed on the mount surface of the board 10.

Figure 5:
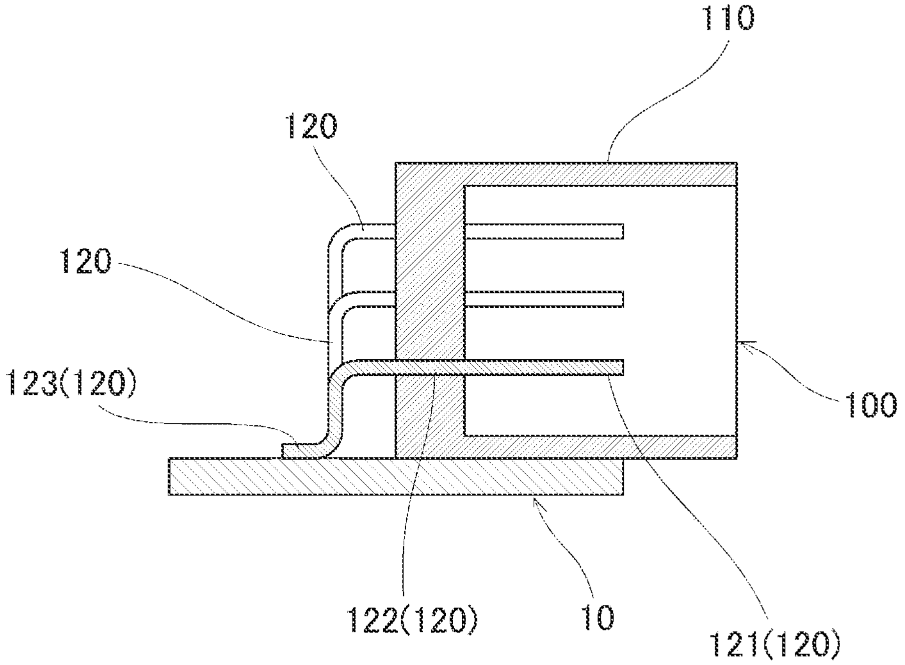
FIG. 5 is a sectional view showing a longitudinal section of a portion indicated by 5-5 line in FIG. 2.
Figure 5:
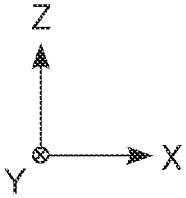

As shown in FIG. 5, the housing 110 of the first embodiment is a resin member having openings penetrating the housing 110 in a direction parallel to the X-direction, which is the first direction. The surface mount terminals 120 are inserted from the rear side to the front side of the housing 110, whereby terminal portions 121 can be arranged inside the openings of the housing 110. Further, the housing 110 can be stably mounted on the board 10 by providing a leg portion (not shown) or the like on the bottom surface of the housing 110 and using the leg portion (not shown) for connection with the board 10.

Figure 6:
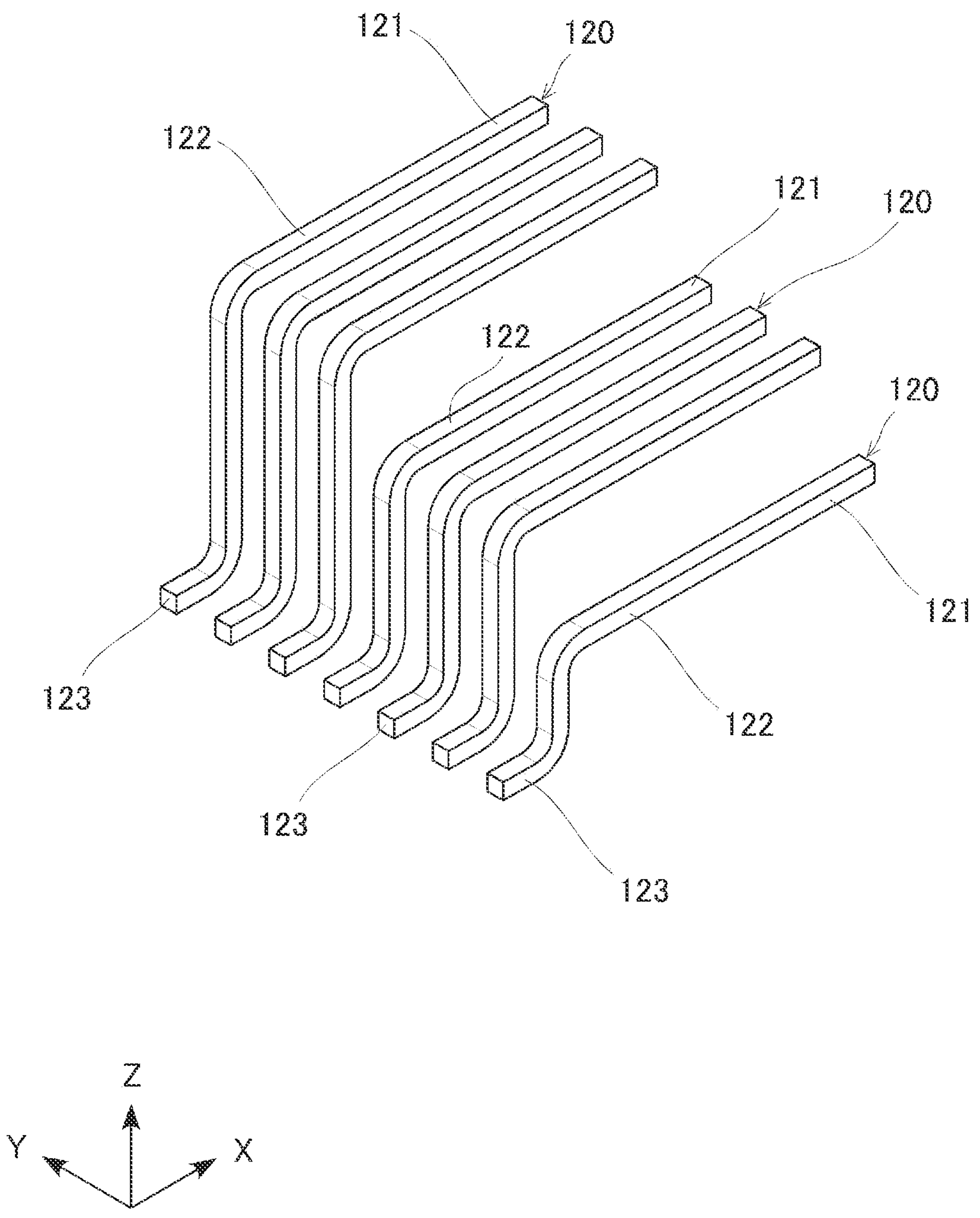
FIG. 6 is a perspective view showing a plurality of terminals included in the connector of the first embodiment.

As shown in FIG. 6, the surface mount terminal 120 of the first embodiment is a member which has a substantially cranked shape as an overall appearance shape thereof and is obtained by bending a rod-shaped metal member at two places by 90 degrees in opposite directions (in a vertical direction and a horizontal direction). A portion of the member extending forward is configured as a terminal portion 121, and is used for electrical connection with a mating connector (not shown). The terminal portion 121 is a portion to be arranged inside the opening of the housing 110 when the surface mount terminal 120 is inserted from the rear side to the front side of the housing 110.

Further, the surface mount terminal 120 of the first embodiment has the fixed portion 122 as a portion to be fixedly connected to the housing 110 when the surface mount terminal 120 is inserted from the rear side to the front side of the housing 110. The fixed portion 122 of the first embodiment is configured as a rod-shaped member extending in the X-direction which is the first direction, and for example, an uneven shape may be added to the surface shape of the fixed portion 122 for a securely fixing connection with the housing 110, thereby improving frictional force for fixing to the housing 110, or a flange-shaped portion may be added to reinforce or position the fixed portion to the housing 110.

Further, the surface mount terminal 120 of the first embodiment has the mount portion 123 extending in a direction parallel to the mount surface of the board 10 having the mount surface parallel to the XY plane at the rear side thereof. The mount portion 123 is a portion to be soldered to the electrically conductive pad portion 11 formed on the mount surface of the board 10. As a method for soldering the mount portion 123 to the pad portion 11, for example, cream solder is printed in advance at the positions of the pad portions 11, and the connector 100 and the board 10 are put into a reflow furnace while the connector 100 is placed on the board 10 so that the mount portions 123 are in contact with the pad portions 11. The cream solder is melted by heating in the reflow furnace, so that the solder-joint between the mount portions 123 and the pad portions 11 can be completed.

Figure 3:
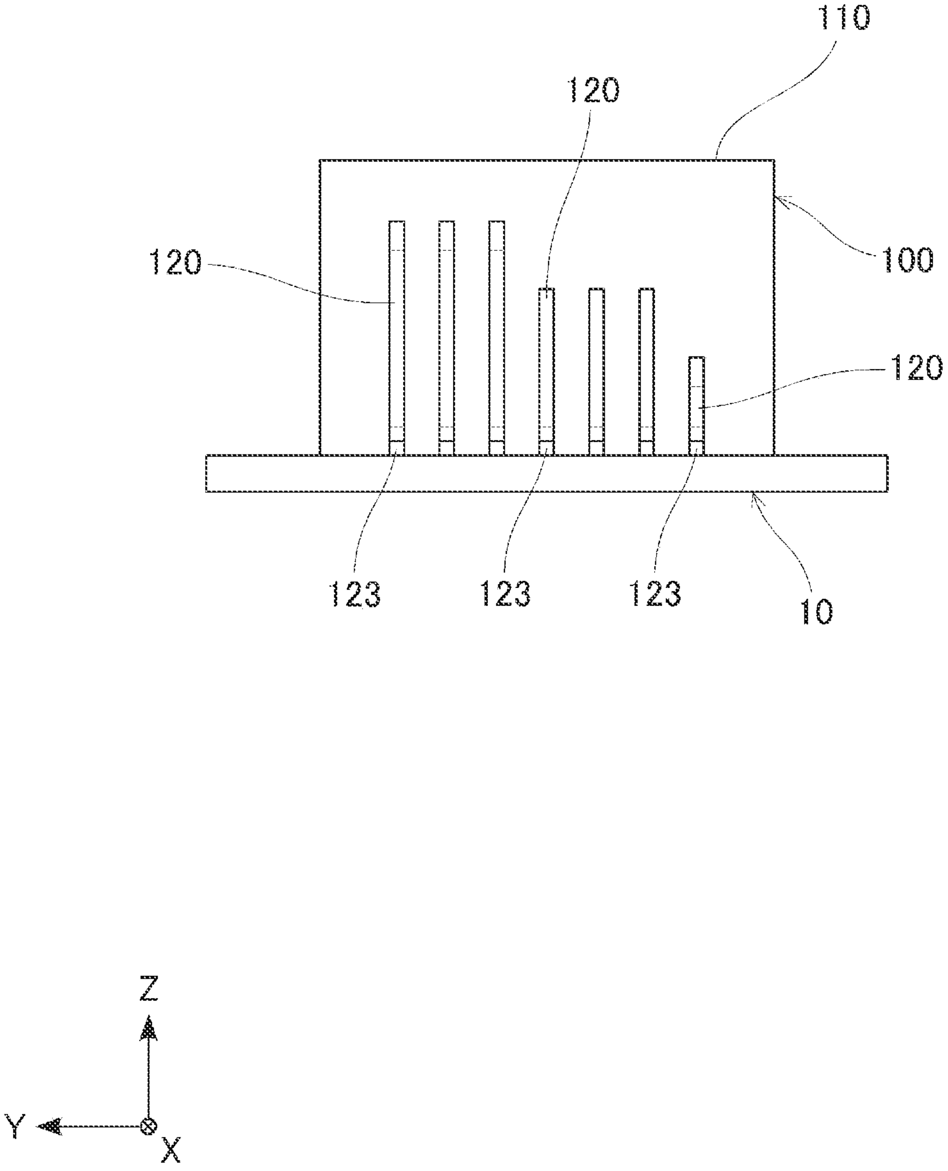
FIG. 3 is a rear view of the connector of the first embodiment.
Figure 4:
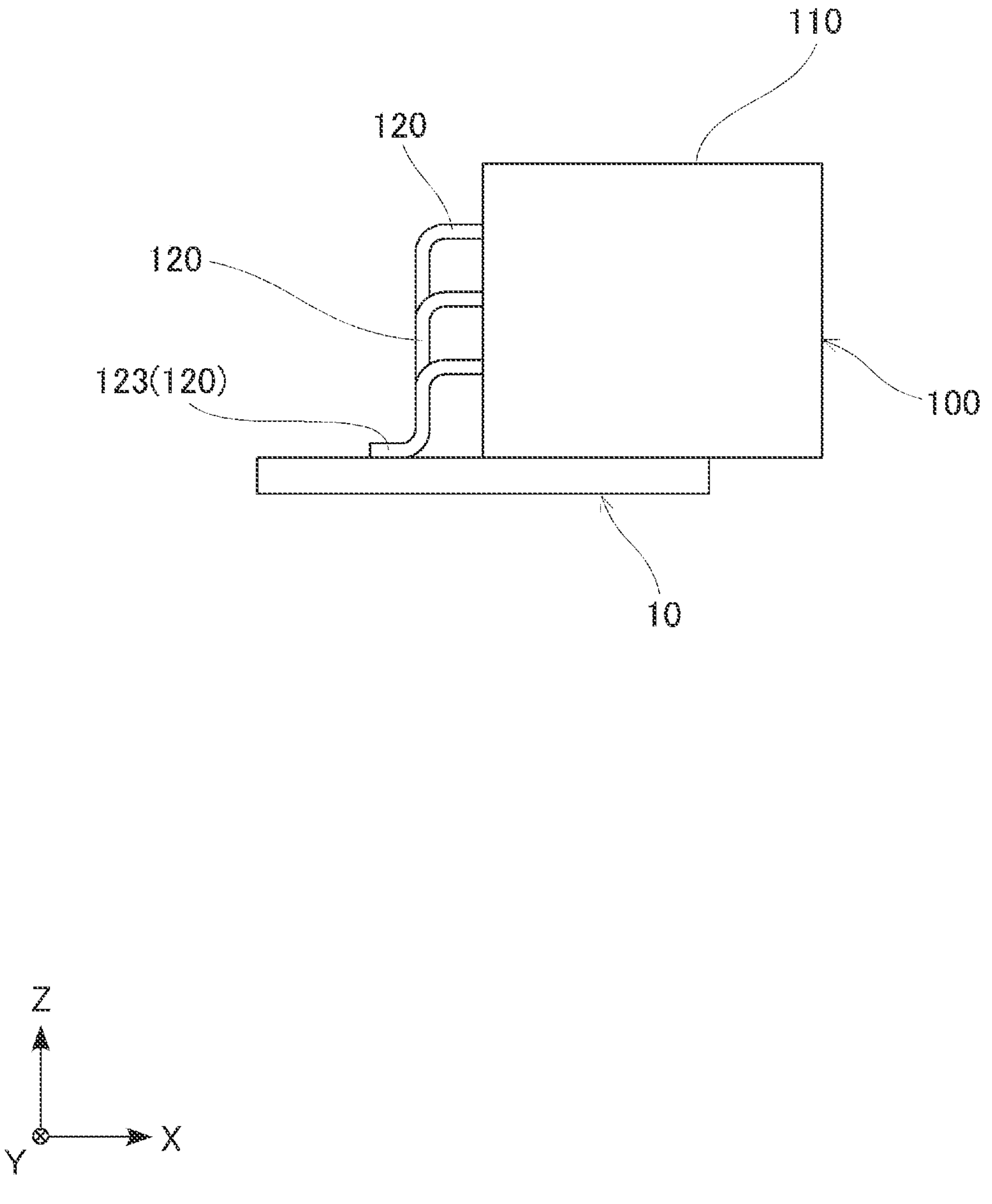
FIG. 4 is a left side view of the connector of the first embodiment.

As shown in FIG. 3, when the connector 100 mounted on the mount surface of the board 10 is viewed from the rear side thereof along the first direction, the seven surface mount terminals 120 included in the connector 100 of the first embodiment are arranged side by side from the left side surface side to the right side surface side in the second direction. Further, in the first embodiment, the connector 100 is configured so that the surface mount terminal 120 having the smallest length dimension from the mount portion 123 to the fixed portion 122 among the seven surface mount terminals 120 is located at the outermost end on the left side surface side in the second direction (which is the left end, and also the right end on the paper surface in FIG. 3), and the length dimension from the mount portion 123 to the fixed portion 122 is larger or the same dimension according to the arrangement order from the left side surface side to the right side surface side in the second direction.

Here, the mount portion 123 of the surface mount terminal 120 during the reflow soldering process undergoes lift-up depending on the height of the fixed portion 122 thereof, and the coplanarity deteriorates. However, the deterioration in coplanarity causes the posture of the connector 100 to tend to tilt due to vibration or surface tension of molten solder in the reflow soldering process. It has been clarified by inventors' studies that when the posture of the connector 100 tilts, the mount portion 123 of the surface mount terminal 120 whose fixed portion 122 is located at the lowest position serves as a fulcrum (a rotation center when tilting).

When the conventional connector structure disclosed in Patent Literature 1 described above is verified based on such findings, when a plurality of surface mount terminals which are different in the length dimension from the mount portion 123 to the fixed portion 122 are arranged alternately, the expanding length direction is also larger due to thermal effect in the reflow soldering process as the length dimension from the mount portion 123 to the fixed portion 122 is larger, so that the positions of the mount portions of the plurality of surface mount terminals change depending on the length dimension from the mount portion 123 to the fixed portion 122. Therefore, soldering failure caused by deterioration of coplanarity is likely to occur.

Further, when the surface mount terminal 120 serving as a fulcrum is not located at the outermost end on one side in the arrangement direction (for example, the outside such as the left end or the right end) unlike the connector 100 of the first embodiment as shown in FIG. 3, the position of the mount portion 123 of the surface mount terminal 120 located on one side of the fulcrum lowers, whereas the position of the mount portion 123 of the surface mount terminal 120 located on the other side of the fulcrum rises (gets away from the molten solder), so that soldering failure is likely to occur in the surface mount terminal 120 on the other side of the fulcrum.

However, in the connector 100 of the first embodiment, since the surface mount terminal 120 serving as a fulcrum is arranged at the leftmost end (outside) on the left side surface side in the arrangement direction as shown in FIG. 3, the tilt of the posture of the connector 100 causes the positions of the mount portions 123 of all the surface mount terminals 120 to shift downward (in the direction approaching the molten solder), so that occurrence of soldering failure is suppressed. In other words, as shown in FIG. 3, the connector 100 of the first embodiment is configured so that the surface mount terminal 120 having the smallest length dimension from the mount portion 123 to the fixed portion 122 among the seven surface mount terminals 120 is arranged at the leftmost end on the left side surface side (the right end on the paper surface in FIG. 3), and the length dimension from the mount portion 123 to the fixed portion 122 is larger or is the same according to the arrangement order from the left side surface side to the right side surface side, so that the deterioration of coplanarity can be minimized, and a connector 100 in which soldering failure is unlikely to occur can be achieved. It should be noted that these effects have been confirmed by simulations and empirical studies by the inventors.

The configuration of the connector 100 of the first embodiment and the significant action and effect exhibited by the configuration have been described above with reference to FIGS. 1 to 6. However, the technical scope of the present invention is not limited to the scope described in the above-mentioned first embodiment. Various changes or improvements can be made to the above-mentioned first embodiment. Therefore, second to sixth embodiments which are various modification examples achievable by the connector of the present invention will be described with reference to FIGS. 7 to 18. In the second to sixth embodiments described below, the same or similar members as or to those in the first embodiment described above may be designated by the same reference signs, and the description thereof may be omitted. Further, the first direction, the second direction, and the third direction defined in the first embodiment will be described as the same definitions.

Second Embodiment

A connector 200 of a second embodiment will be described with reference to FIGS. 7 and 8.

Figure 8:
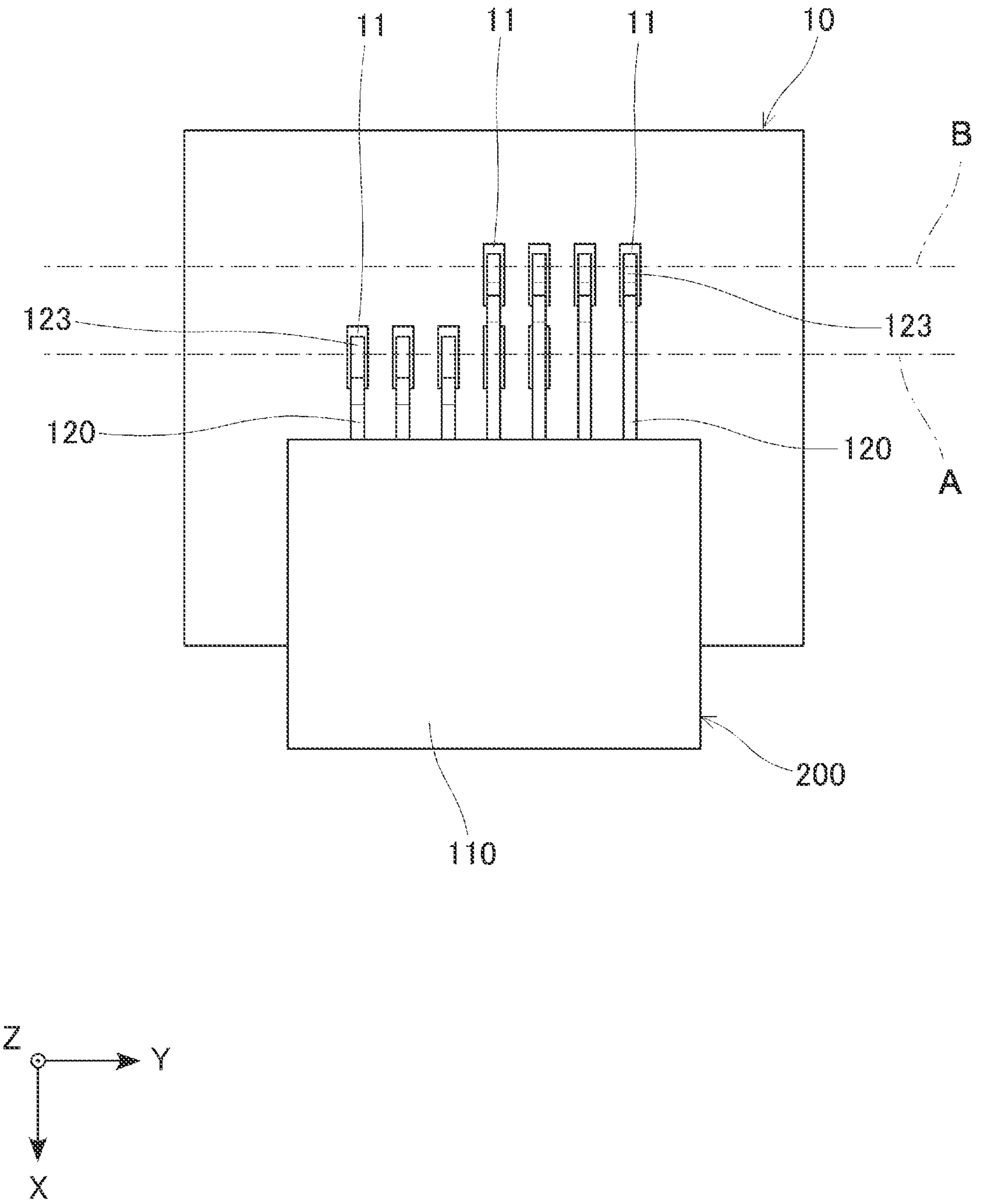
FIG. 8 is a top view of the connector of the second embodiment.

As shown in FIG. 8, the connector 200 of the second embodiment is arranged so that the arrangement of a plurality of surface mount terminals 120 arranged side by side from the left side surface side to the right side surface side in the second direction forms two rows when the mount surface of the board 10 is viewed along the third direction from the upper side. In other words, in the second embodiment, the plurality of mount portions 123 are arranged on two rows, one of the rows being a row which is nearer to the housing 110 and indicated by a one-dotted chain line designated by reference sign A, and the other row being a row which is farther from the housing 110 and indicated by a one-dotted chain line designated by reference sign B in FIG. 8.

Figure 7:
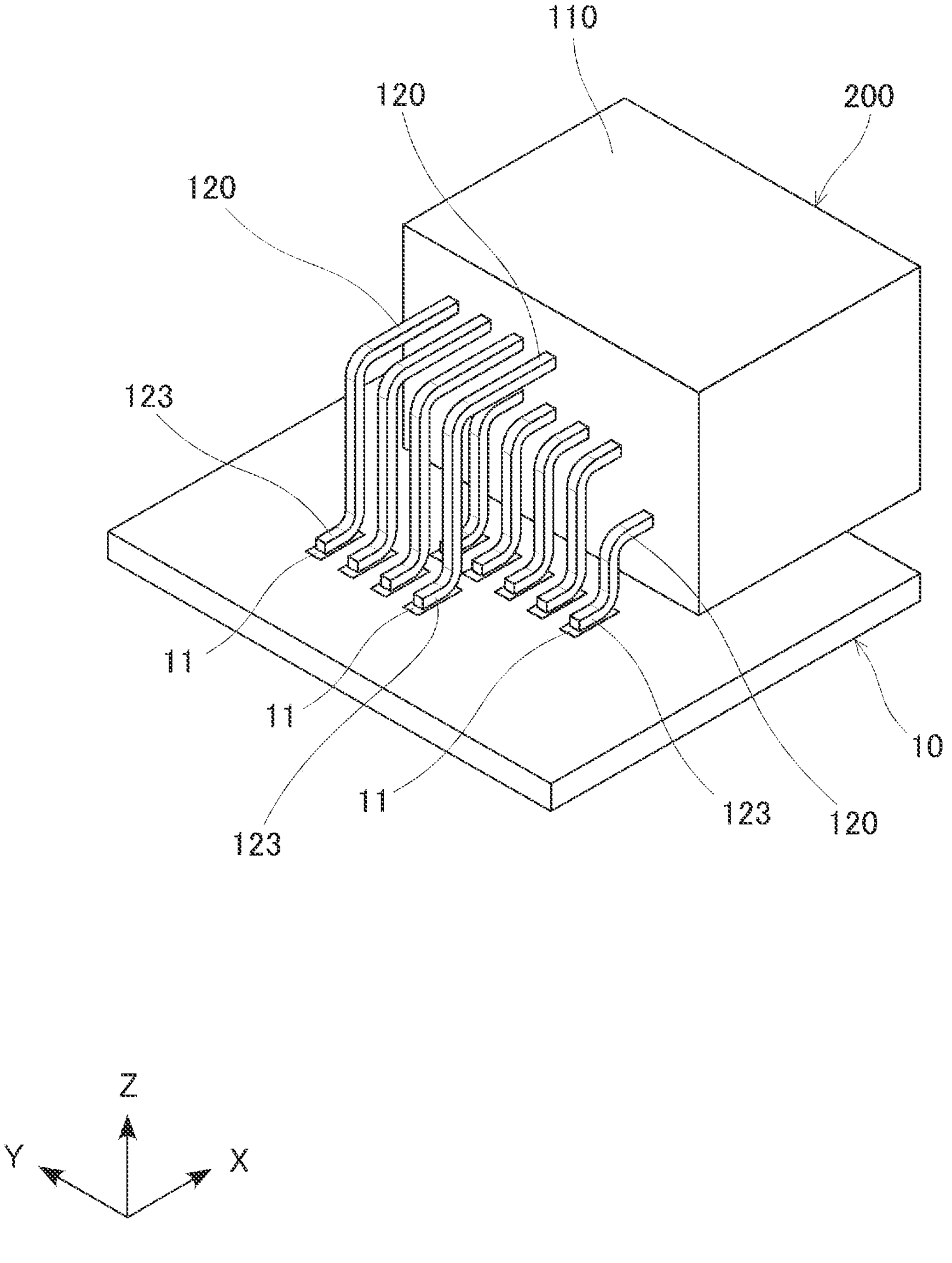
FIG. 7 is a perspective view of a connector of a second embodiment when viewed from the upper left side of a back surface thereof.

As shown in FIG. 7, the connector 200 of the second embodiment is configured so that the surface mount terminal 120 having the smallest length dimension from the mount portion 123 to the fixed portion 122 is arranged on the leftmost end on the left side surface side when viewed with respect to all the rows of the plurality of surface mount terminals 120. Further, in the second embodiment, the plurality of surface mount terminals 120 are arranged so that the length dimension from the mount portion 123 to the fixed portion 122 is larger or is the same according to the arrangement order from the left side surface side to the right side surface side in the second direction.

In other words, in the connector 200 of the second embodiment, as shown in FIG. 7, the surface mount terminal 120 serving as a fulcrum in the reflow soldering process is arranged at the leftmost end (outside) on the left side surface side in the arrangement direction. Therefore, even when a plurality of surface mount terminals 120 are arranged so that the arrangement of the plurality of surface mount terminals 120 forms two rows, the posture of the connector 100 tilts with the surface mount terminal 120 arranged at the leftmost end (outside) serving as a fulcrum, so that the positions of the mount portions 123 of all the surface mount terminals 120 shift downward (in the direction approaching the molten solder), and the occurrence of soldering failure is suppressed as compared with the prior art. Therefore, according to the connector 200 of the second embodiment, it is possible to suitably prevent the occurrence of soldering failure.

Third Embodiment

A connector 300 of a third embodiment will be described with reference to FIGS. 9 and 10.

Figure 10:
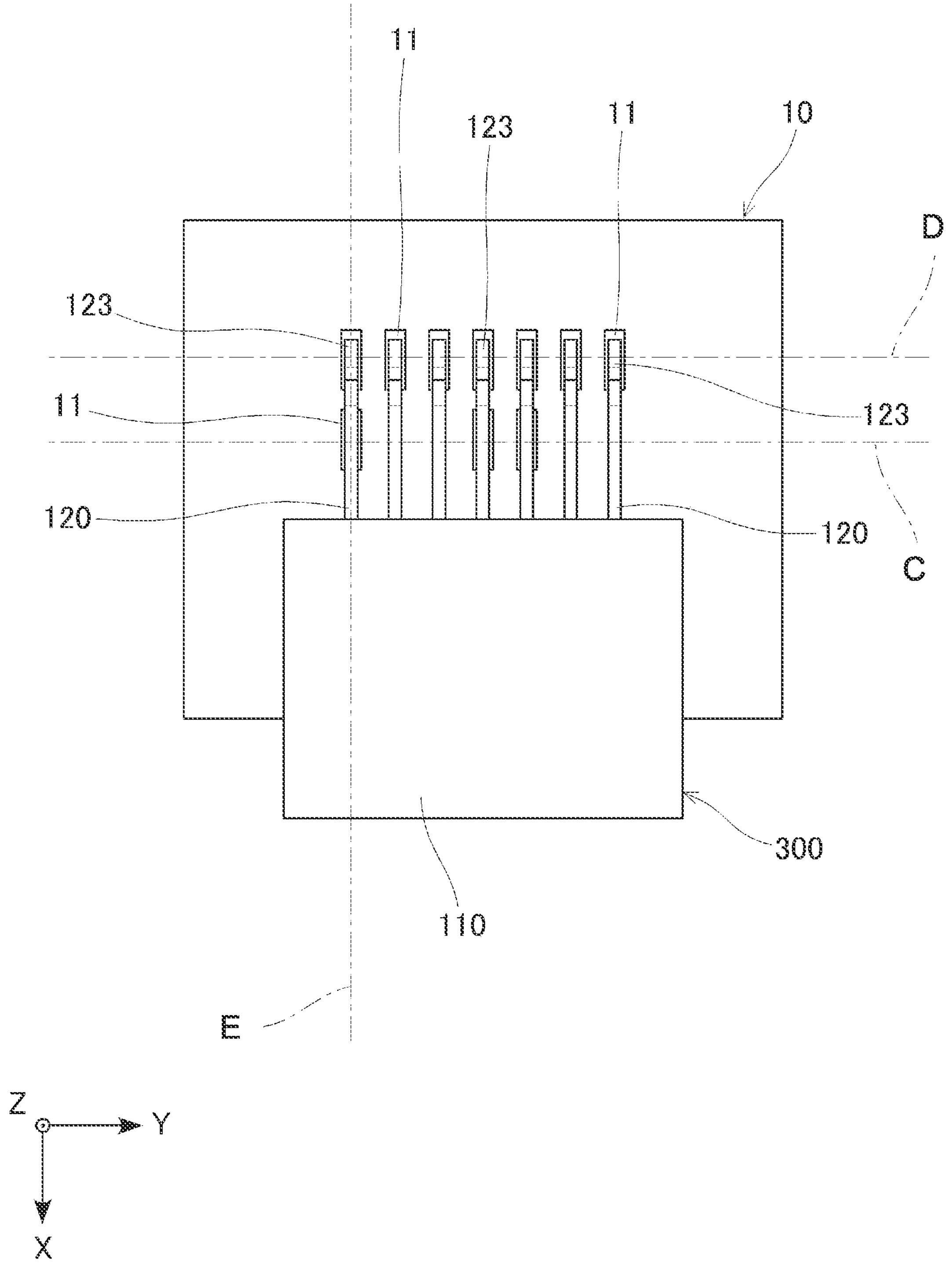
FIG. 10 is a top view of the connector of the third embodiment.

As shown in FIG. 10, the connector 300 of the third embodiment is arranged so that the arrangement of a plurality of surface mount terminals 120 arranged side by side from the left side surface side to the right side surface side in the second direction forms two rows when the mount surface of the board 10 is viewed along the third direction from the upper side. In other words, in the third embodiment, the plurality of mount portions 123 are arranged on two rows, one of the rows being a row which is nearer to the housing 110 and indicated by a one-dotted chain line designated by reference sign C, and the other row being a row which is farther from the housing 110 and indicated by a one-dotted chain line designated by reference sign D in FIG. 10.

Figure 9:
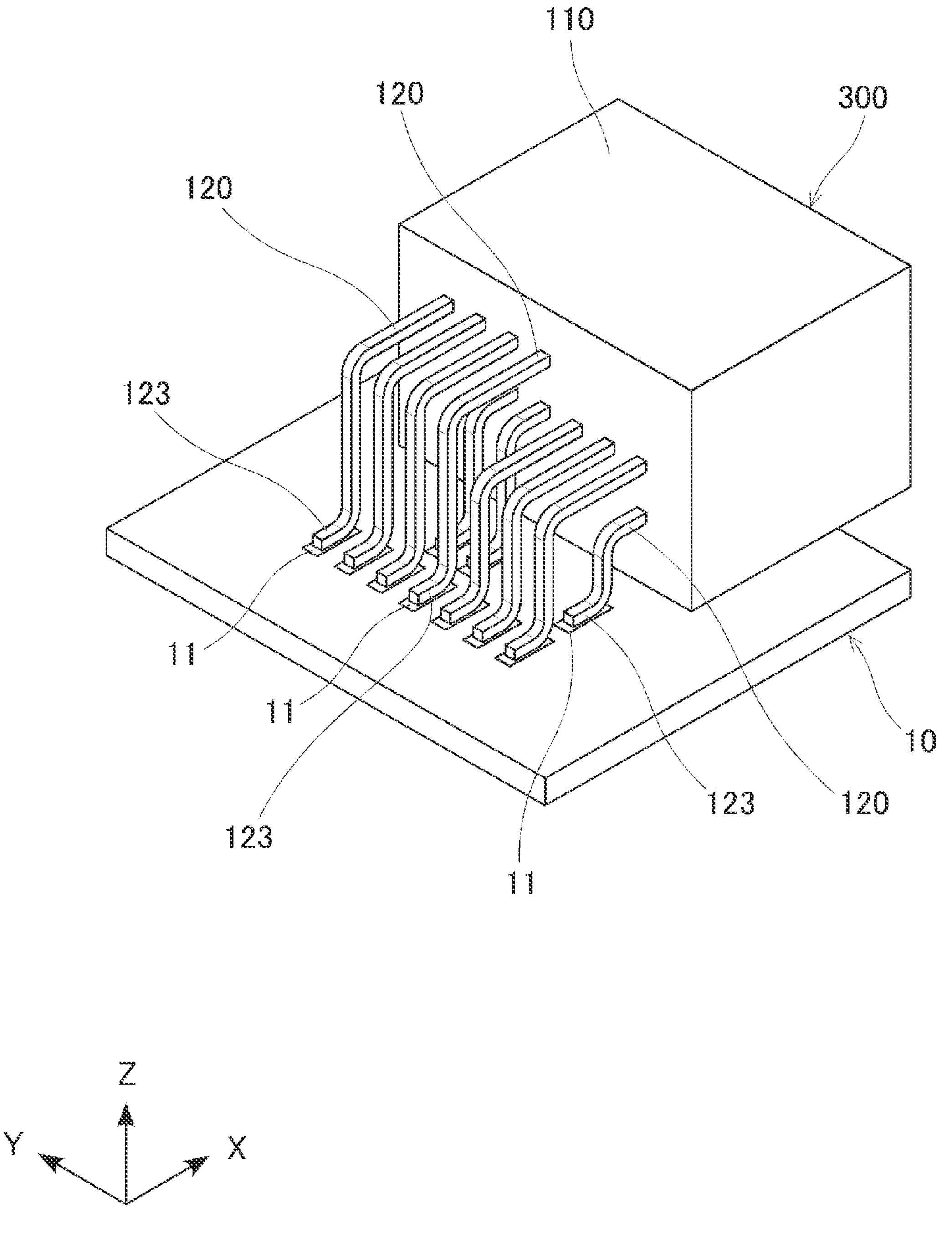
FIG. 9 is a perspective view of a connector of a third embodiment when viewed from the upper left side of a back surface thereof.

Further, as shown in FIG. 9, the connector 300 of the third embodiment is configured so that the surface mount terminal 120 having the smallest length dimension from the mount portion 123 to the fixed portion 122 in all the rows (both the row designated by reference sign C and the row designated by reference sign D) of the plurality of surface mount terminals 120 is arranged at the leftmost end on the left side surface side in the second direction. Further, as shown in FIGS. 9 and 10, the connector 300 of the third embodiment is configured so that the surface mount terminals 120 of all rows arranged at the leftmost end on the left side surface side in the second direction are arranged to be superimposed on a line indicated by a one-dotted chain line designated by reference sign E in FIG. 10 when the connector mounted on the mount surface of the board 10 is viewed in the front-rear direction which is the first direction.

In the third embodiment, the plurality of surface mount terminals 120 are arranged so that the length dimension from the mount portion 123 to the fixed portion 122 is larger or the same dimension according to the arrangement order from the left side surface side to the right side surface side in the second direction in all the rows (both the row designated by reference sign C and the row designated by reference sign D) of the plurality of surface mount terminals 120.

In other words, in the connector 300 of the third embodiment, the surface mount terminal 120 serving as a fulcrum in the reflow soldering process is arranged at the leftmost end (outside) on the left side surface side in the arrangement direction as shown in FIG. 9, and also such an arrangement configuration is adopted for all the rows (both the row designated by reference sign C and the row designated by reference sign D) of the plurality of surface mount terminals 120. Therefore, even when the plurality of surface mount terminals 120 are arranged so that the arrangement thereof forms two rows, the posture of the connector 100 tilts while the surface mount terminals 120 arranged at the leftmost end (outside) of the entire connector 300 serve as fulcrums, so that the positions of the mount portions 123 of all the surface mount terminals 120 shift downward (in the direction approaching the molten solder), and the occurrence of soldering failure is suppressed as compared with the prior art. Therefore, according to the connector 300 of the third embodiment, it is possible to suitably prevent the occurrence of soldering failure.

Fourth Embodiment

A connector 400 of a fourth embodiment will be described with reference to FIGS. 11 and 12.

Figure 11:
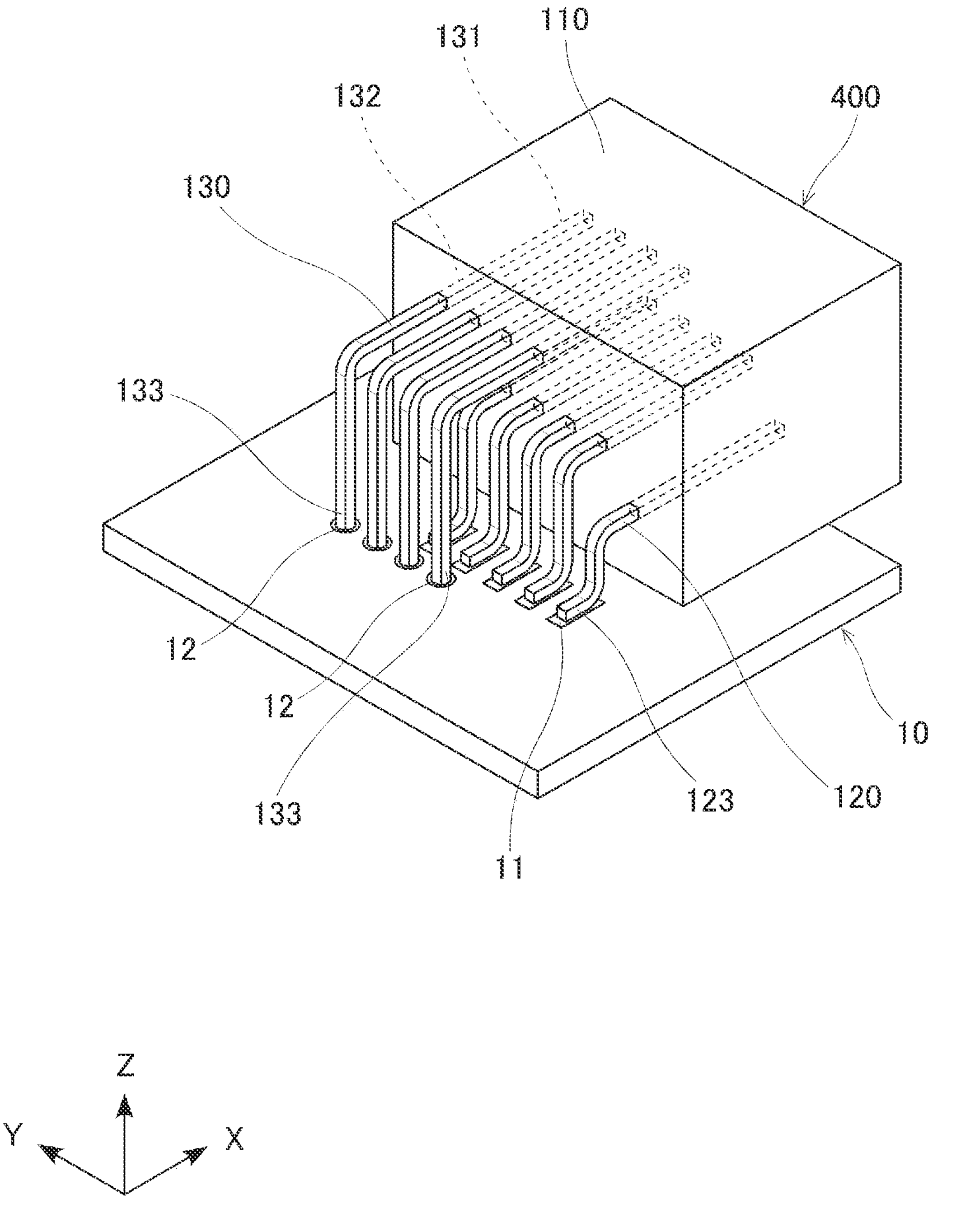
FIG. 11 is a perspective view of a connector of a fourth embodiment when viewed from the upper left side of a back surface thereof.
Figure 12:
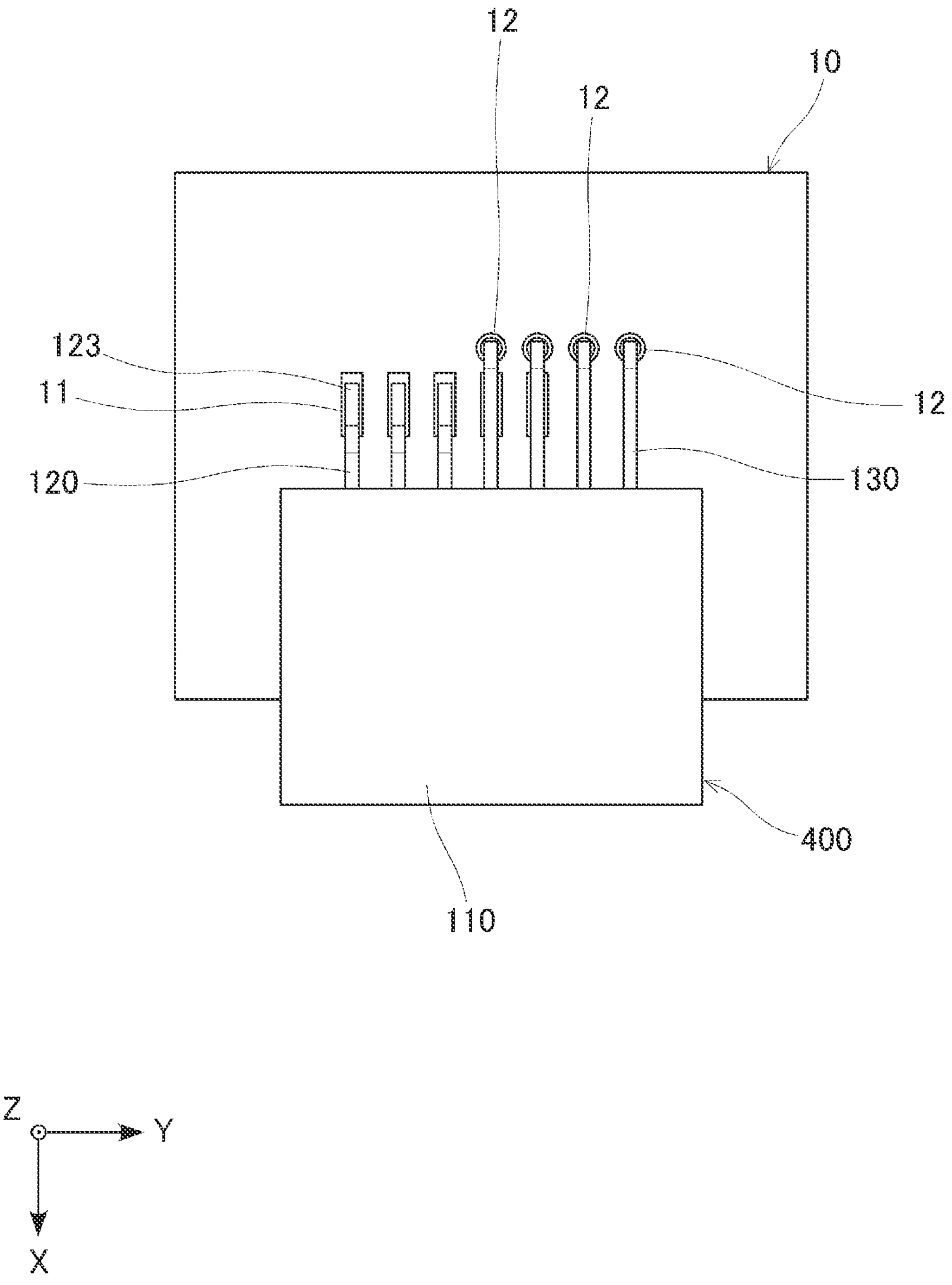
FIG. 12 is a top view of the connector of the fourth embodiment.

With respect to the connector of the present invention, it may adopt a configuration in which a plurality of surface mount terminals 120 and a plurality of through-hole terminals 130 coexist as a plurality of terminals as in the connector 400 of the fourth embodiment shown in FIGS. 11 and 12. In the fourth embodiment, an example in which five surface mount terminals 120 are installed and four through-hole terminals 130 are installed is shown.

As shown in FIG. 11, each of the plurality of through-hole terminals 130 includes a terminal portion 131 to be arranged in the housing 110, a fixed portion 132 to be fixed to the housing 110, and a mount portion 133 to be soldered to a through-hole 12 formed on the mount surface of the board 10 in an electrically connectable state. The connector 400 of the fourth embodiment is configured so that all of terminals having the largest length dimension from the mount portion 123, 133 to the fixed portion 122, 132 among the plurality of terminals configured by the plurality of surface mount terminals 120 and the plurality of through-hole terminals 130 serve as through-hole terminals 130.

In the connector of the present invention, in order to solve the soldering failure problem caused by the deterioration of coplanarity of the surface mount terminals, it is necessary that the surface mount terminal 120 serving as a fulcrum in the reflow soldering process is arranged at the leftmost end (outside) on the left side surface side in the arrangement direction. Therefore, it is necessary to adopt a configuration in which the surface mount terminal 120 having the smallest length dimension from the mount portion 123 to the fixed portion 122 among the plurality of surface mount terminals 120 included in the connector of the present invention is arranged at the leftmost end on the left side surface side (or the rightmost end on the right side surface side) in the second direction. However, since the through-hole terminals do not have the soldering failure problem caused by the deterioration of coplanarity, the through-hole terminals 130 can be freely arranged without considering the length dimension from the mount portion 133 to the fixed portion 132. Therefore, if the through-hole terminals 130 are adopted for all the terminals having the largest length dimension from the mount portion 123, 133 to the fixed portion 122, 132 among the plurality of terminals, it would be easy to apply the configuration of the present invention in which the surface mount terminal 120 serving as a fulcrum in the reflow soldering process is arranged on the leftmost end on the left side surface side (or the rightmost end on the right side surface side) in the arrangement direction. In other words, according to the connector 400 of the fourth embodiment, the applicable range of the connector of the present invention can be expanded. Further, in the connector 400 of the fourth embodiment, the surface mount terminals 120 and the through-hole terminals 130 coexist. However, when all of terminals arranged at positions where the fixed portions 122 and 132 are located at the highest positions are set as through-hole terminals 130, the heights of the fixed portions 122 of the surface mount terminals 120 are relatively low, so that the effect of thermal expansion of the housing 110 is reduced.

Fifth Embodiment

A connector 500 of a fifth embodiment will be described with reference to FIGS. 13 and 14. The connector 500 of the fifth embodiment is a modification example of the connector 400 of the fourth embodiment.

In the connector 400 of the fourth embodiment shown in FIGS. 11 and 12, the surface mount terminals 120 and the through-hole terminals 130 are arranged in the same rows, respectively. However, the application scope of the present invention is not limited to the configuration in which the same type of terminals is arranged side by side so as to be adjacent to one another as shown in the fourth embodiment, and it includes a configuration in which plural types of terminals are arranged in combination.

Figure 13:
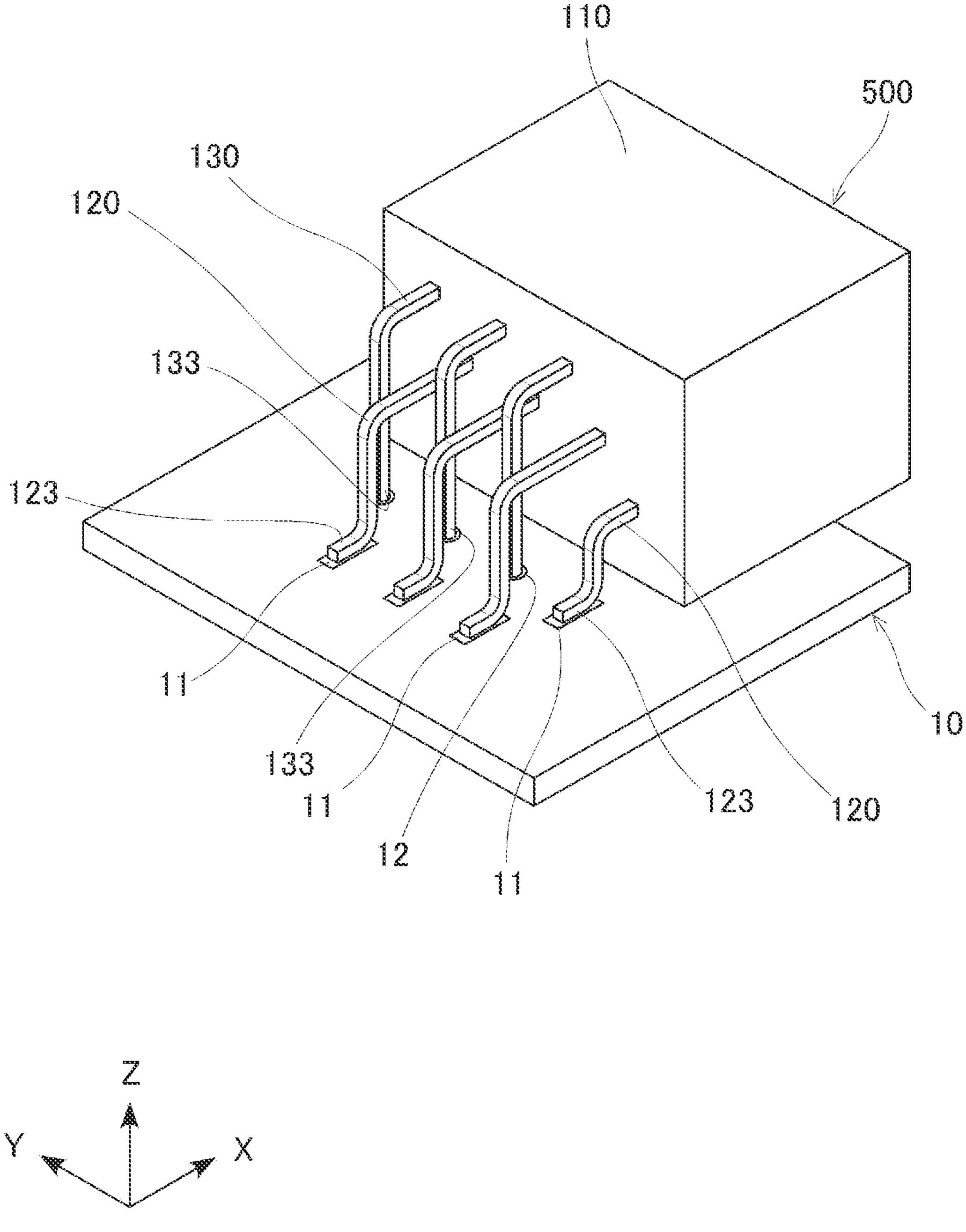
FIG. 13 is a perspective view of a connector of a fifth embodiment when viewed from the upper left side of a back surface thereof.
Figure 14:
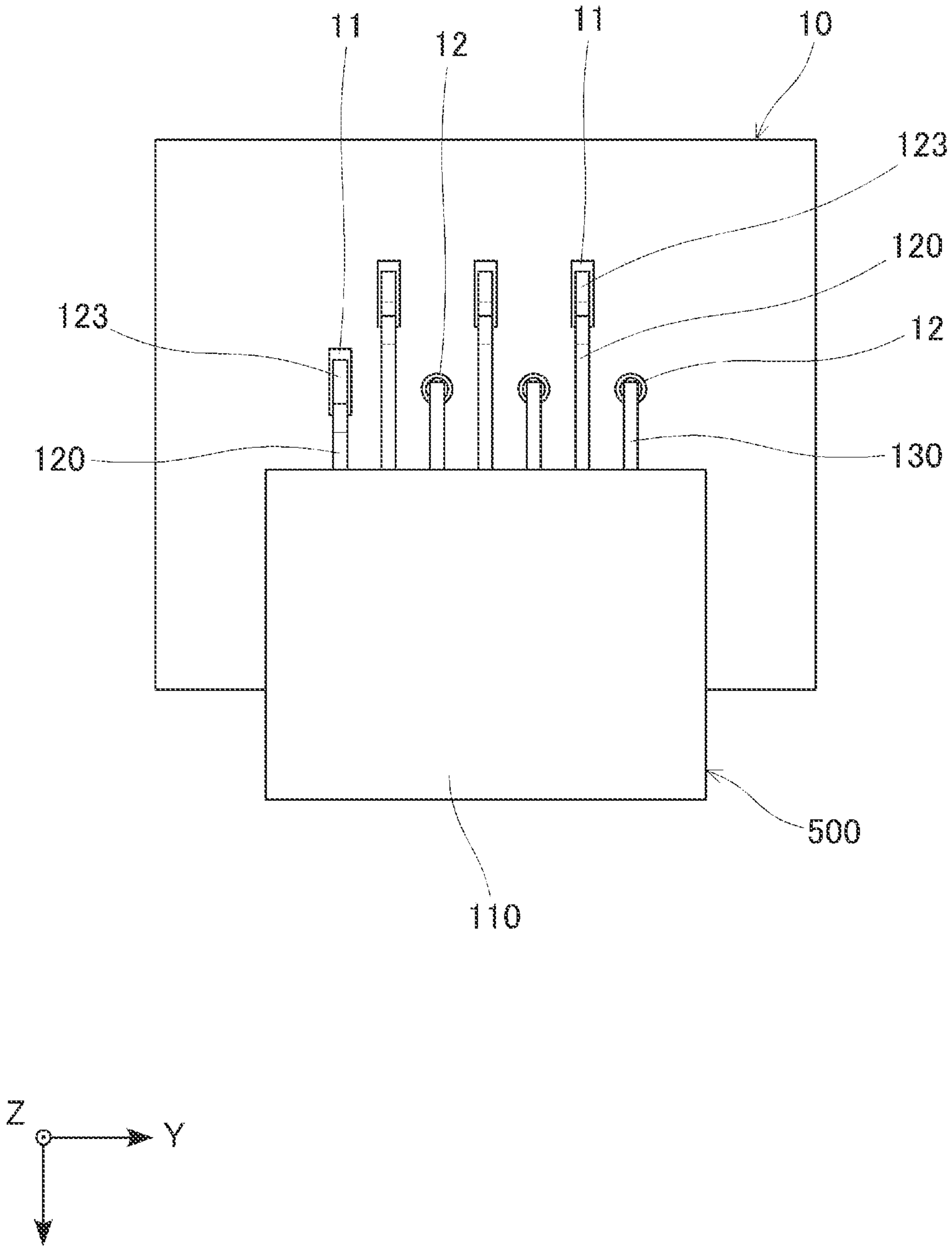
FIG. 14 is a top view of the connector of the fifth embodiment.
Figure 15:
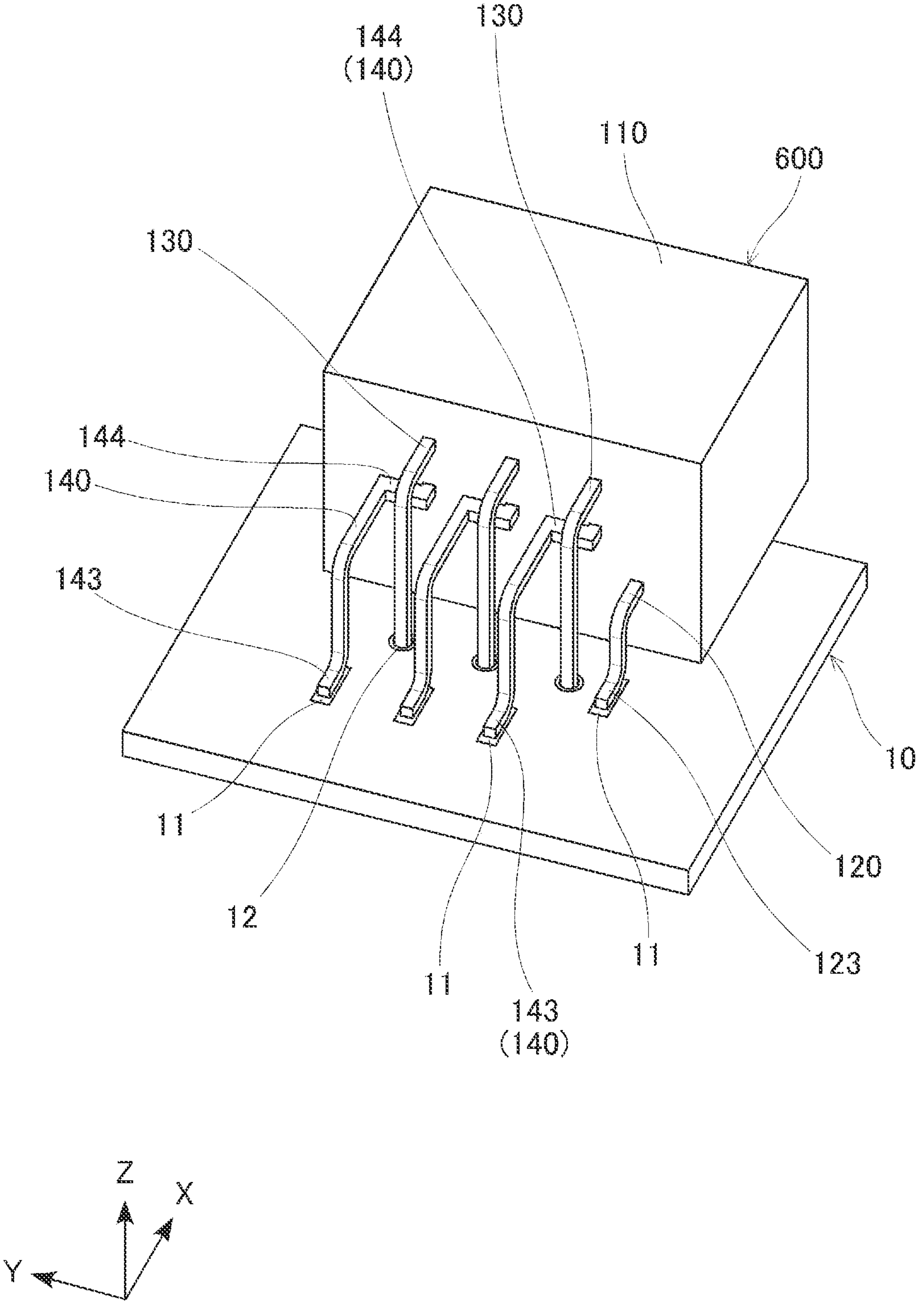
FIG. 15 is a perspective view of a connector of a sixth embodiment when viewed from the upper left side of a back surface thereof.

In other words, it is possible to adopt a configuration in which one surface mount terminal 120 and three through-hole terminals 130 are arranged in a row nearer to the housing 110 as in the connector 500 of the fifth embodiment shown in FIGS. 13 and 14. Even in the case of the connector 500 of the fifth embodiment, the surface mount terminal 120 having the smallest length dimension from the mount portion 123 to the fixed portion 122, which serves as a fulcrum in the solder reflow process, is arranged at the leftmost end (outside) on the left side surface side in the arrangement direction. Therefore, even when a plurality of surface mount terminals 120 and a plurality of through-hole terminals 130 are arranged in combination, the posture of the connector 100 tilts while the surface mount terminal 120 arranged at the leftmost end (outside) serves as a fulcrum, and thus the positions of the mount portions 123 of all the surface mount terminals 120 shift downward (in the direction approaching the molten solder), so that the occurrence of soldering failure is suppressed as compared with the prior art. Accordingly, even in the connector 500 of the fifth embodiment, the occurrence of soldering failure can be suitably prevented.

Sixth Embodiment

A connector 600 of a sixth embodiment will be described with reference to FIGS. 15 to 18.

Figure 16:
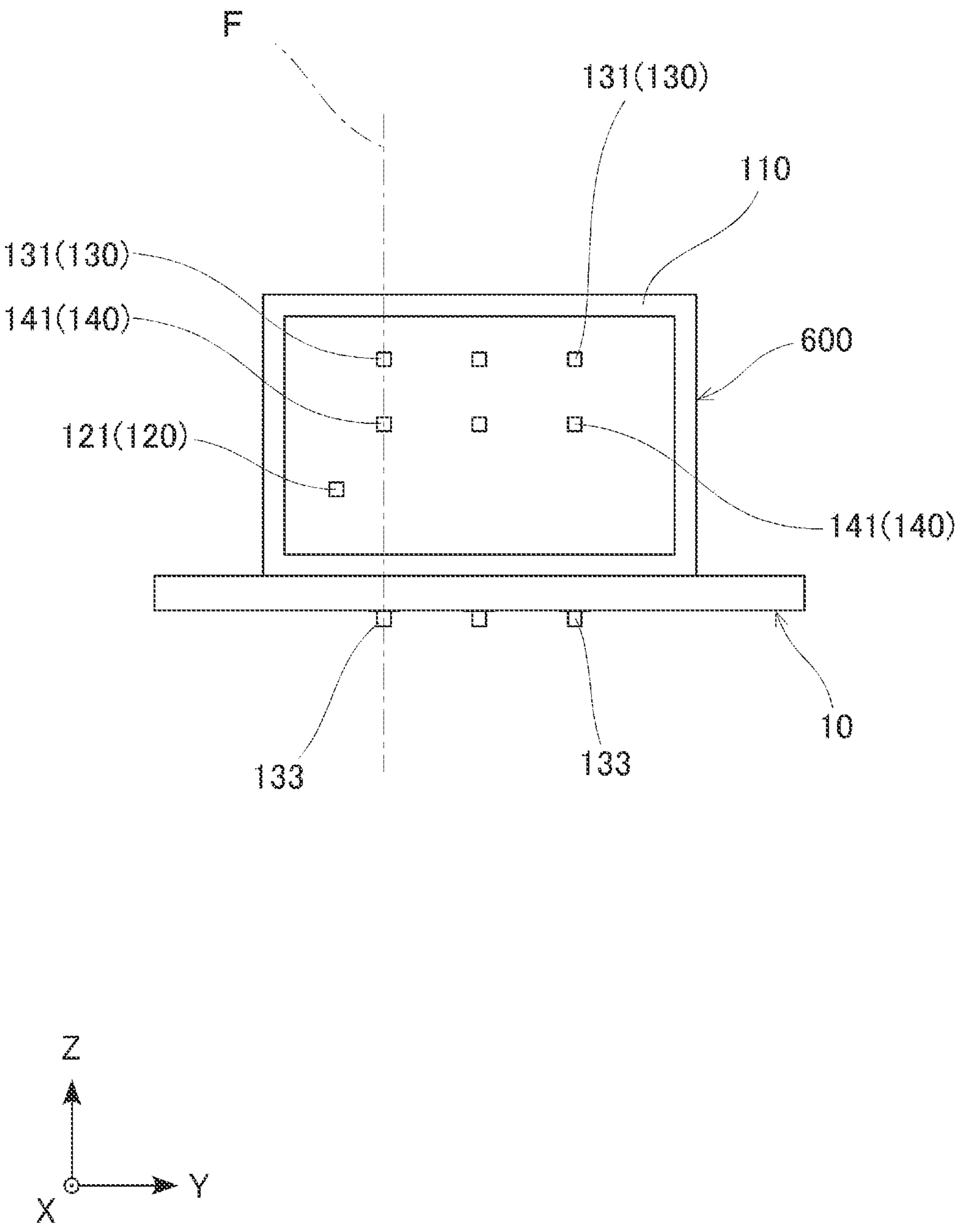
FIG. 16 is a front view of the connector of the sixth embodiment.
Figure 17:
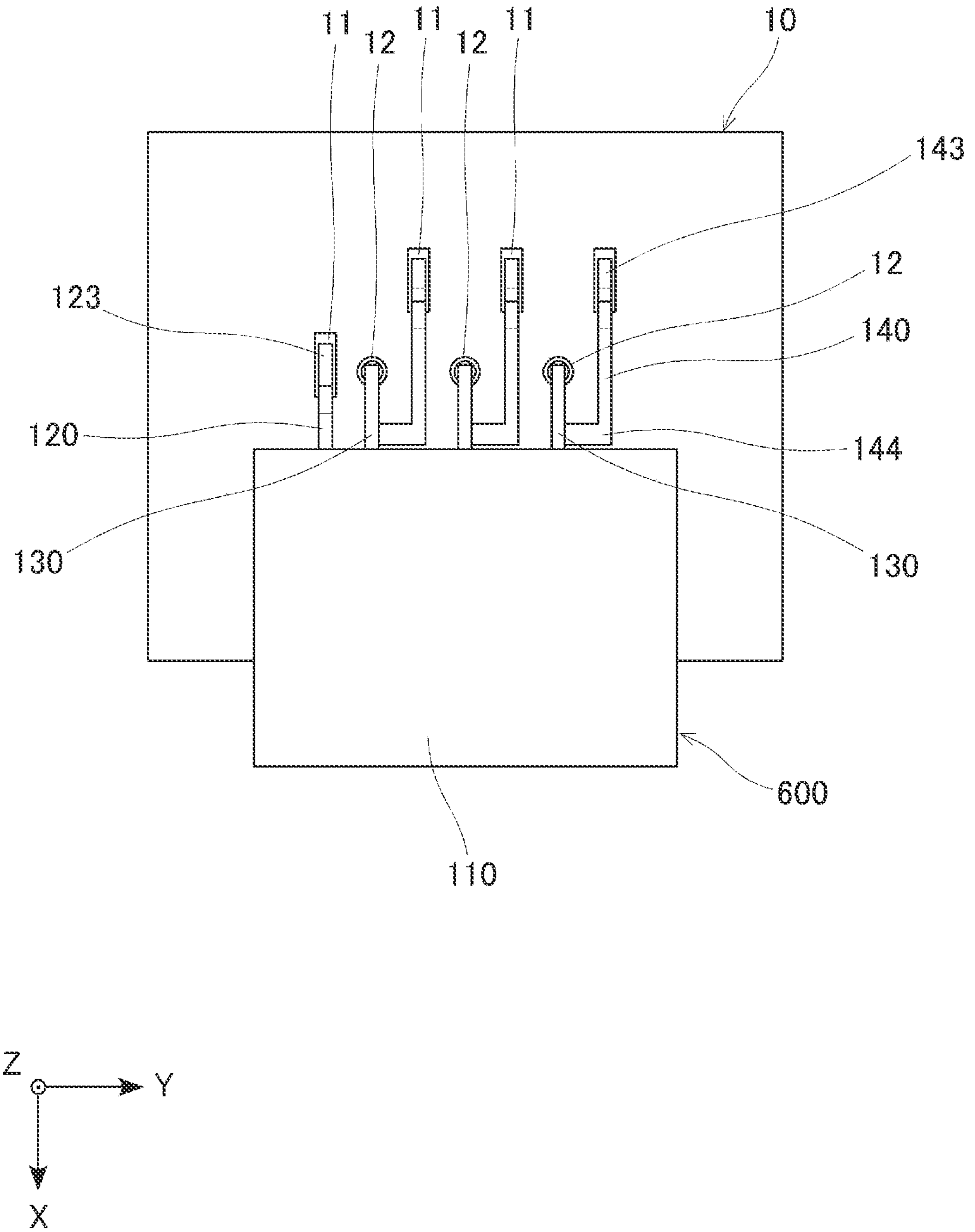
FIG. 17 is a top view of the connector of the sixth embodiment.

The connector 600 of the sixth embodiment shown in FIGS. 15 to 18 is configured so that a plurality of surface mount terminals 120 and 140 and a plurality of through-hole terminals 130 coexist as a plurality of terminals. However, in the connector 600 of the sixth embodiment, as shown in FIG. 16, the terminal portion 141 of the surface mount terminal 140 and the terminal portion 131 of the through-hole terminal 130 are arranged to overlap each other in the up-and-down direction which is the third direction so that they are arranged on a line indicated by a one-dotted chain line designated by reference sign F in FIG. 16. In the case of this arrangement configuration, the terminals protruding from the back side of the housing 110 interfere with each other.

Figure 18:
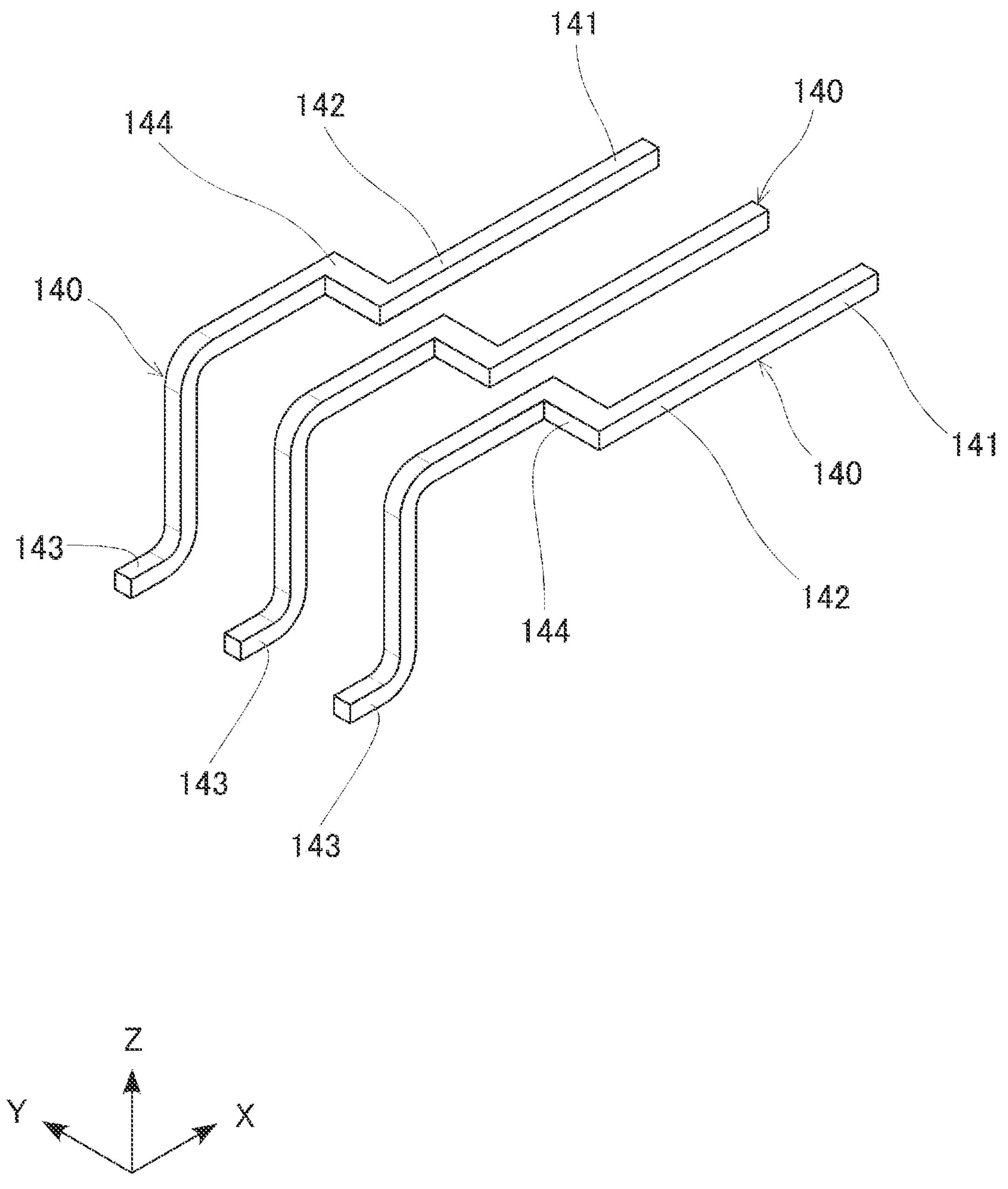
FIG. 18 is a perspective view showing a plurality of terminals included in the connector of the sixth embodiment.

Therefore, in the sixth embodiment, with respect to the surface mount terminals 140 whose fixed portions 142 are located just under the fixed portions 132 of the through-hole terminals 130, as shown in FIG. 18, crank portions 144 which are bent so as to form a crank shape in the horizontal direction are provided between the fixed portion 142 and the mount portion 143 of each of the above surface mount terminals 140. By providing the crank portions 144 to the surface mount terminals 140, the surface mount terminals 140 are arranged so as to avoid the through-hole terminals 130, and the mount portions 143 included in the surface mount terminals 140 are soldered to the pad portions 11 of the board 10 at positions which are farther away from the housing 110 than the mount portions 133 included in the through-hole terminals 130, so that the degree of freedom of the arrangement of the terminal portions in the connector of the present invention is enhanced (particularly, see FIG. 15). In other words, by providing the crank portions to the surface mount terminals, the present invention can be easily applied to various types of connector shapes, and the visual inspection of the soldered state of the mount portions 143 can be facilitated.

Further, in the sixth embodiment, the surface mount terminal 120 having the smallest length dimension from the mount portion 123 to the fixed portion 122 among the plurality of terminals 120, 130, and 140 included in the connector 600 is arranged at the leftmost end on the left side surface side in the second direction. Further, in the connector 600 of the sixth embodiment, the surface mount terminals 120 and 140 and the through-hole terminals 130 coexist. However, when all the terminals arranged at positions where the fixed portions 122, 132 and 142 thereof are located at the highest position are set as the through-hole terminals 130, the heights of the fixed portions 122 and 142 of the surface mount terminals 120 and 140 are relatively low, so that the effect of thermal expansion of the housing 110 is reduced. Therefore, even in the connector 600 of the sixth embodiment, it is possible to suitably prevent the occurrence of soldering failure.

As described above, the first to sixth embodiments as various embodiments that the connector of the present invention can take have been described with reference to FIGS. 1 to 18. Next, examples as specific configurations that the connector of the present invention can take will be described with reference to FIGS. 19 to 26. In the examples described below, the same or similar members as or to those in the first to sixth embodiments described above may be designated by the same reference signs to omit the description thereof. Further, the first direction, the second direction, and the third direction defined in the first to sixth embodiments will be described as the same definitions.

EXAMPLE

As shown in FIGS. 19 to 26, a connector 700 of the present example includes a resin housing 110, a metal cover shell 112 to be installed in the housing 110, a plurality of surface mount terminals 120 and 140 which are some of a plurality of metal terminals to be installed in the housing 110, and a plurality of through-hole terminals 130 which are the residuals of the plurality of metal terminals to be installed in the housing 110. In the connector 700 of the present example, two surface mount terminals 120 having no crank portion 144 are installed, three through-hole terminals 130 are installed, and two surface mount terminals 140 each having a crank portion 144 are installed.

Further, as shown in FIGS. 19 to 24, the connector 700 of the present example is mounted and used on a mount surface of a board 10 having a mount surface parallel to an XY plane defined by an X-direction being a first direction and a Y-direction being a second direction. The board 10 of the present example is, for example, a printed wiring board, and four electrically conductive pad portions 11 to be soldered to total four surface mount terminals 120 and 140 and three through-holes 12 to be soldered to three through-hole terminals 130 are formed on the mount surface of the board 10.

With reference to FIGS. 19 to 24, in the connector 700 of the present example, the connector 700 of the present example and a mating connector are electrically connected to each other by inserting the mating connector (not shown) into an opening portion opened on the front surface side of the connector 700. Further, in the connector 700 of the present example, the connector 700 and a circuit wiring of the board 10 can be connected to each other via electrically conductive pad portions 11 and through-holes 12 formed on the mount surface of the board 10

Figure 19:
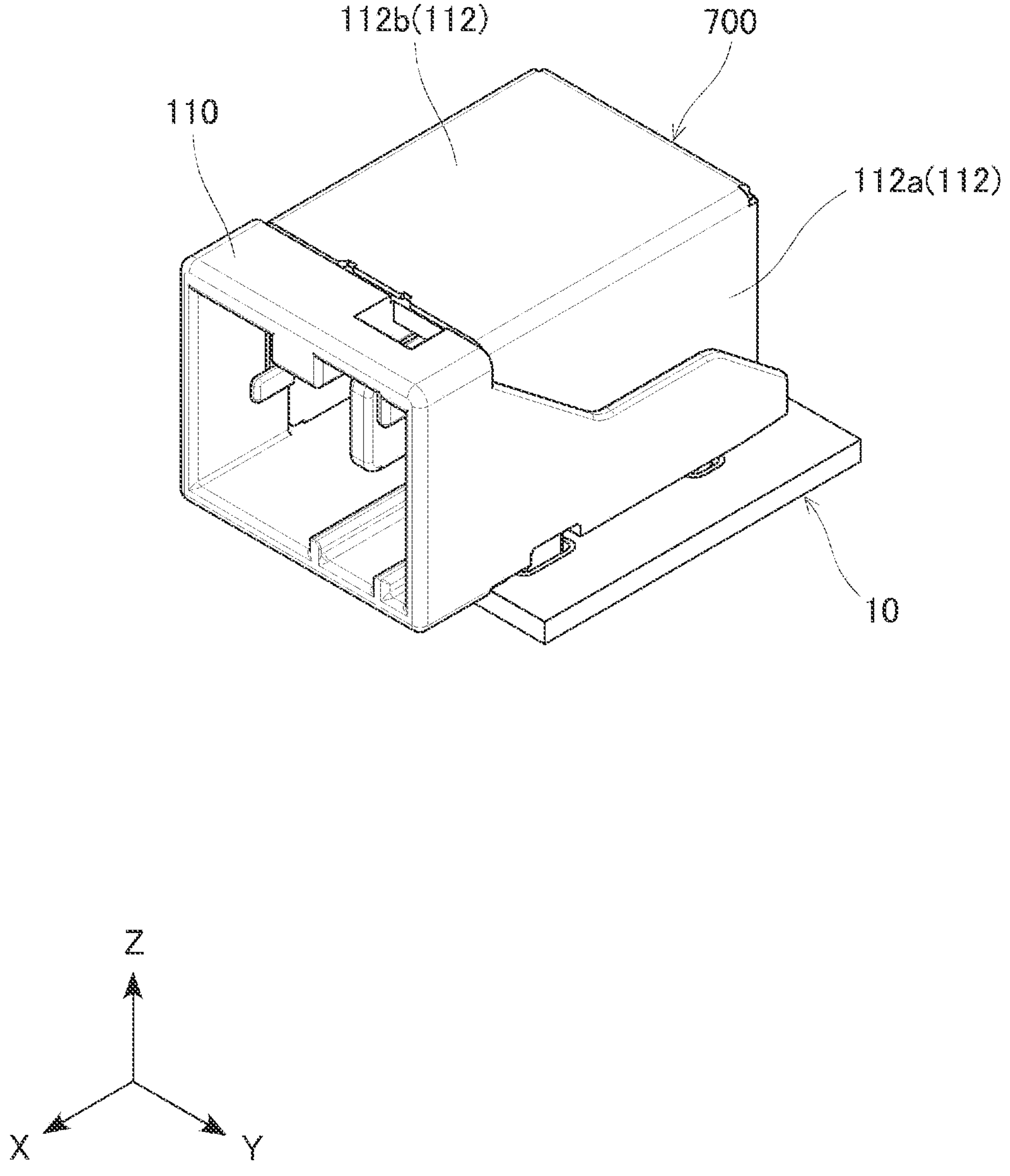
FIG. 19 is a perspective view of a connector of an example when viewed from the upper right side of a front surface thereof.

As shown in FIG. 19, the housing 110 of the present example is a resin member having an opening penetrating through the housing 110 in a direction parallel to the X-direction which is the first direction. By inserting the surface mount terminals 120 and 140 and the through-hole terminals 130 from the rear side to the front side of the housing 110, the terminal portions 121, 131 and 141 can be arranged inside the opening of the housing 110.

Figure 20:
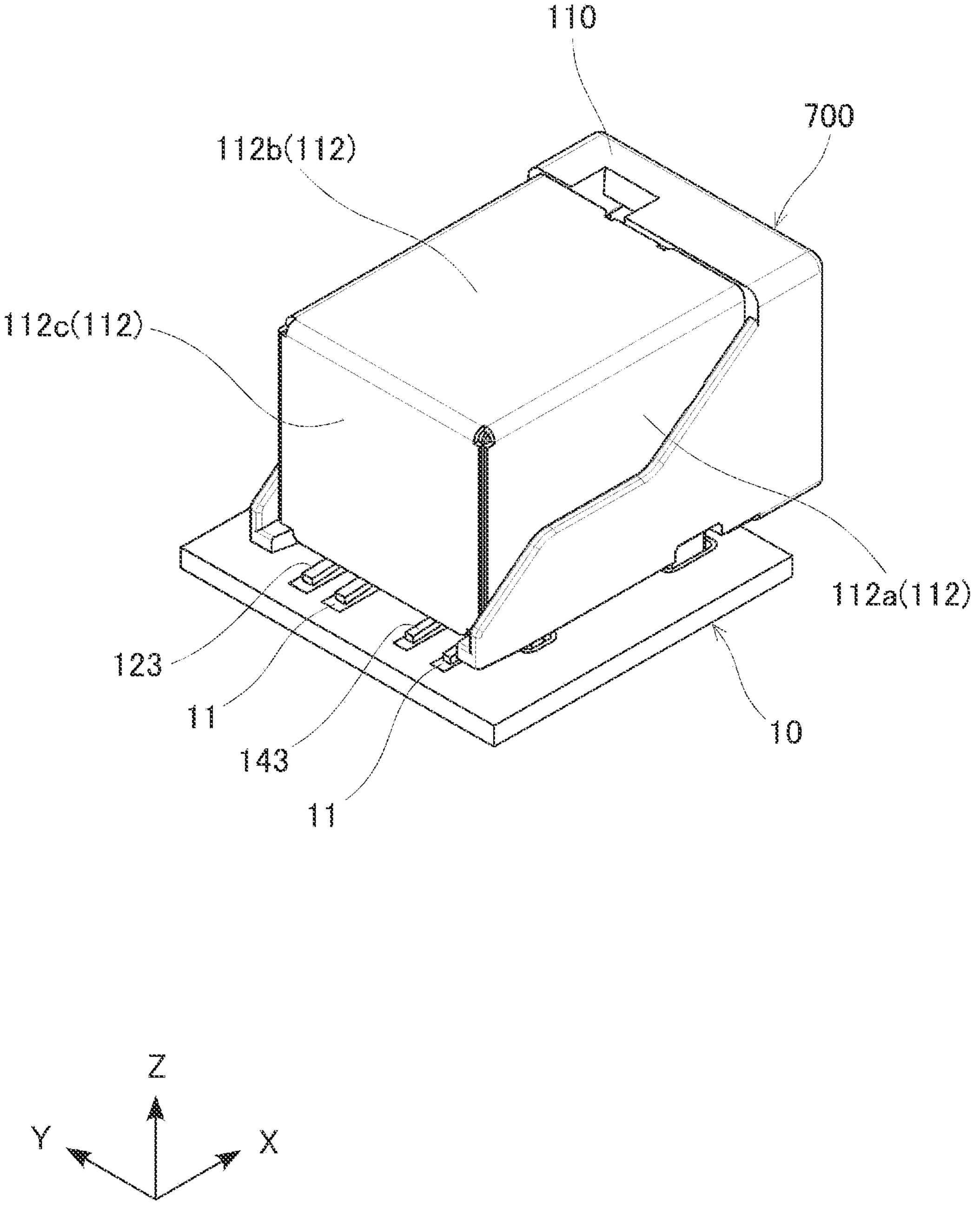
FIG. 20 is a perspective view of the connector of the example when viewed from the upper left side of a rear surface thereof.
Figure 21:
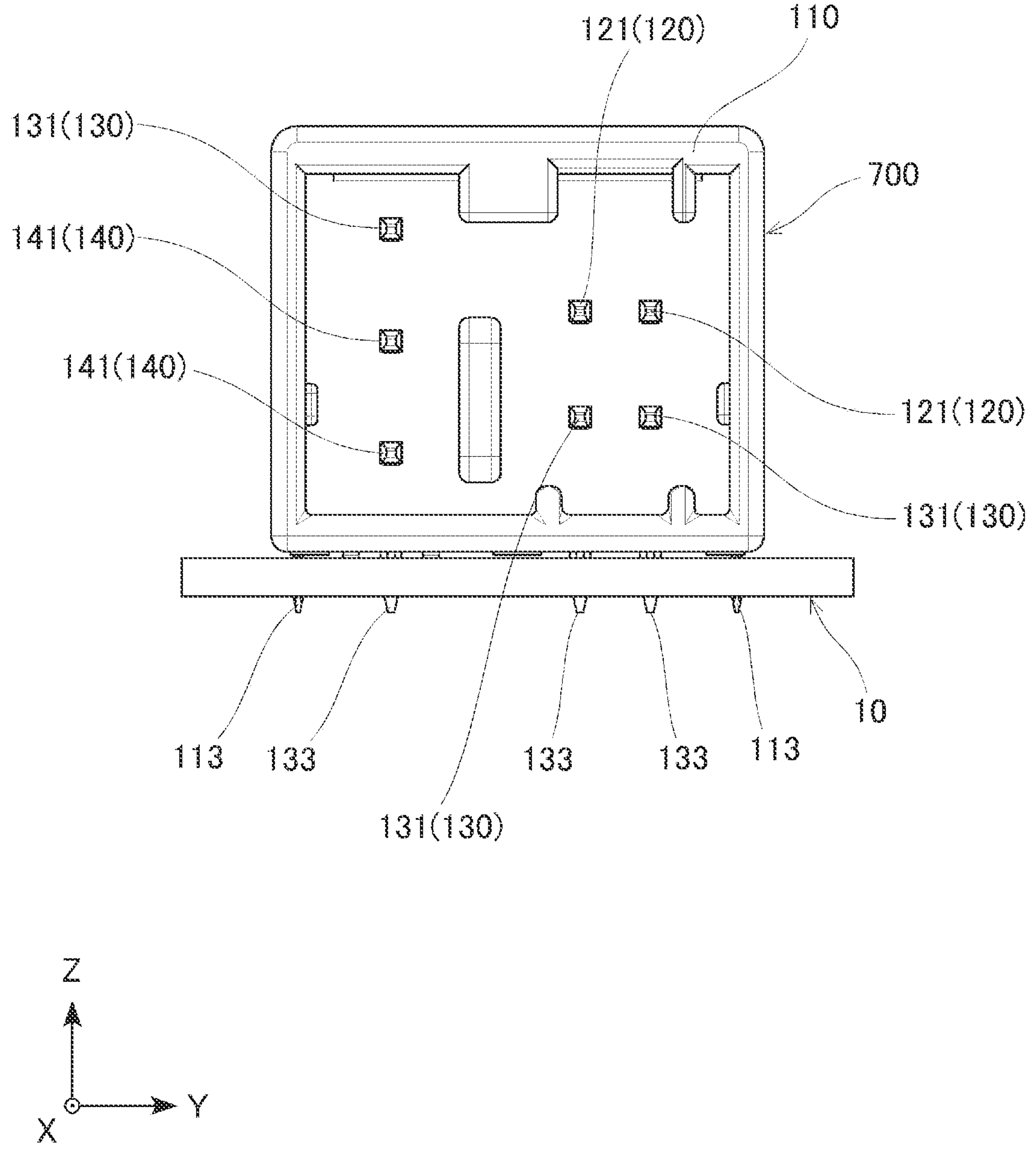
FIG. 21 is a front view of the connector of the example.
Figure 22:
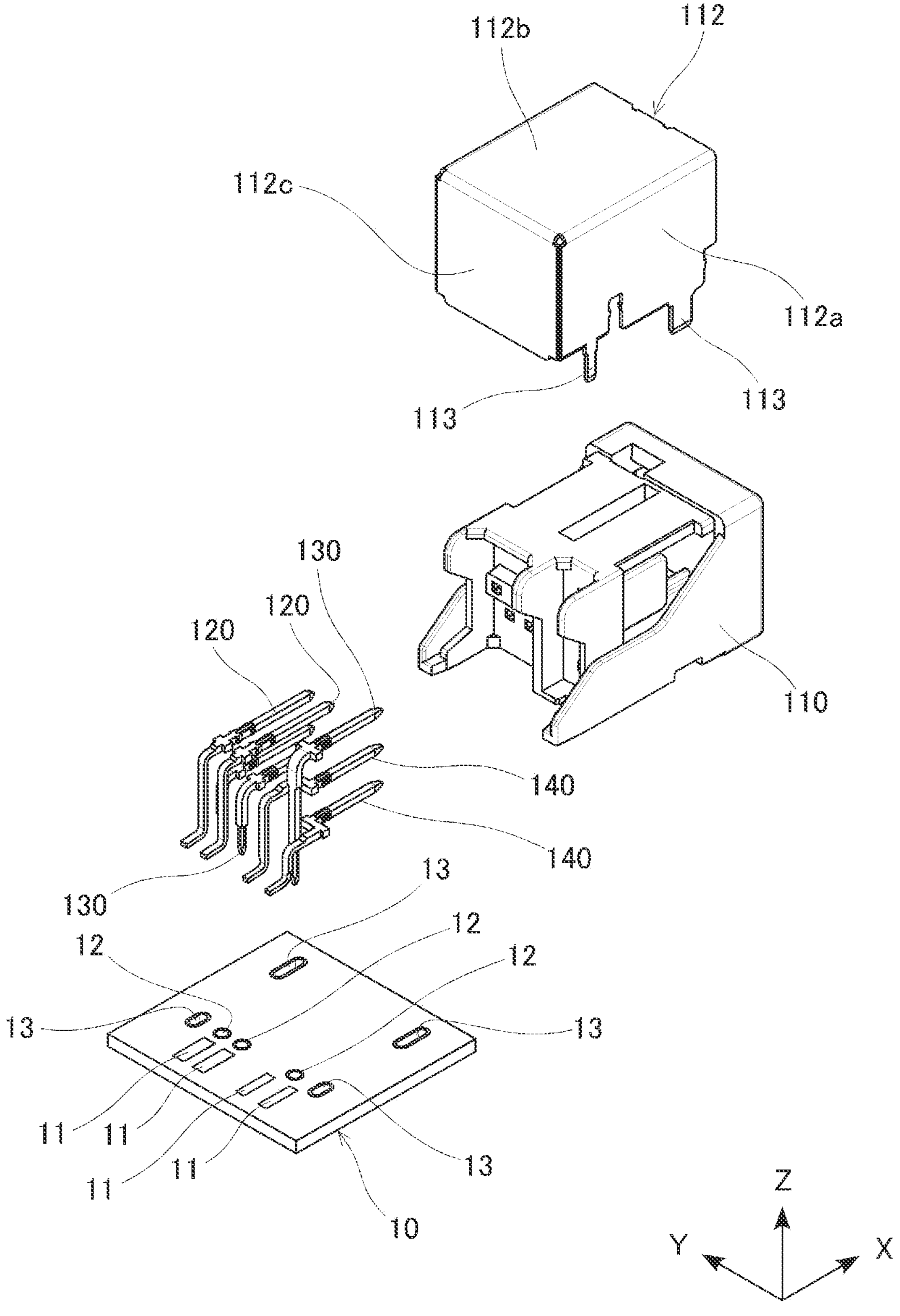
FIG. 22 is an exploded perspective view of the connector of the example when viewed from the upper left side of the example.

As shown in FIGS. 19, 20, and 22, the cover shell 112 of the present example has two side surfaces 112*a*, one top surface 112*b*, and one back surface 112*c*. The cover shell 112 is a metal member, and is installed so as to cover the left and right side surfaces, the top surface, and the back surface of the housing 110, which makes it possible to improve the electromagnetic shielding performance of the connector 700.

Two leg portions 113 are formed below each of the side surfaces 112*a* constituting the cover shell 112, that is, total four leg portions 113 are formed below the two side surfaces 112*a* constituting the cover shell 112. The four leg portions 113 are inserted and press-fitted into the housing 110 in the −Z direction from the upper side to the lower side of the housing 110, thereby fixing the cover shell 112 to the housing 110. Further, the four leg portions 113 are fitted into mount holes 13 formed in the board 10, whereby it is possible to perform stable installation of the connector 700 on the board 10.

Figure 25:
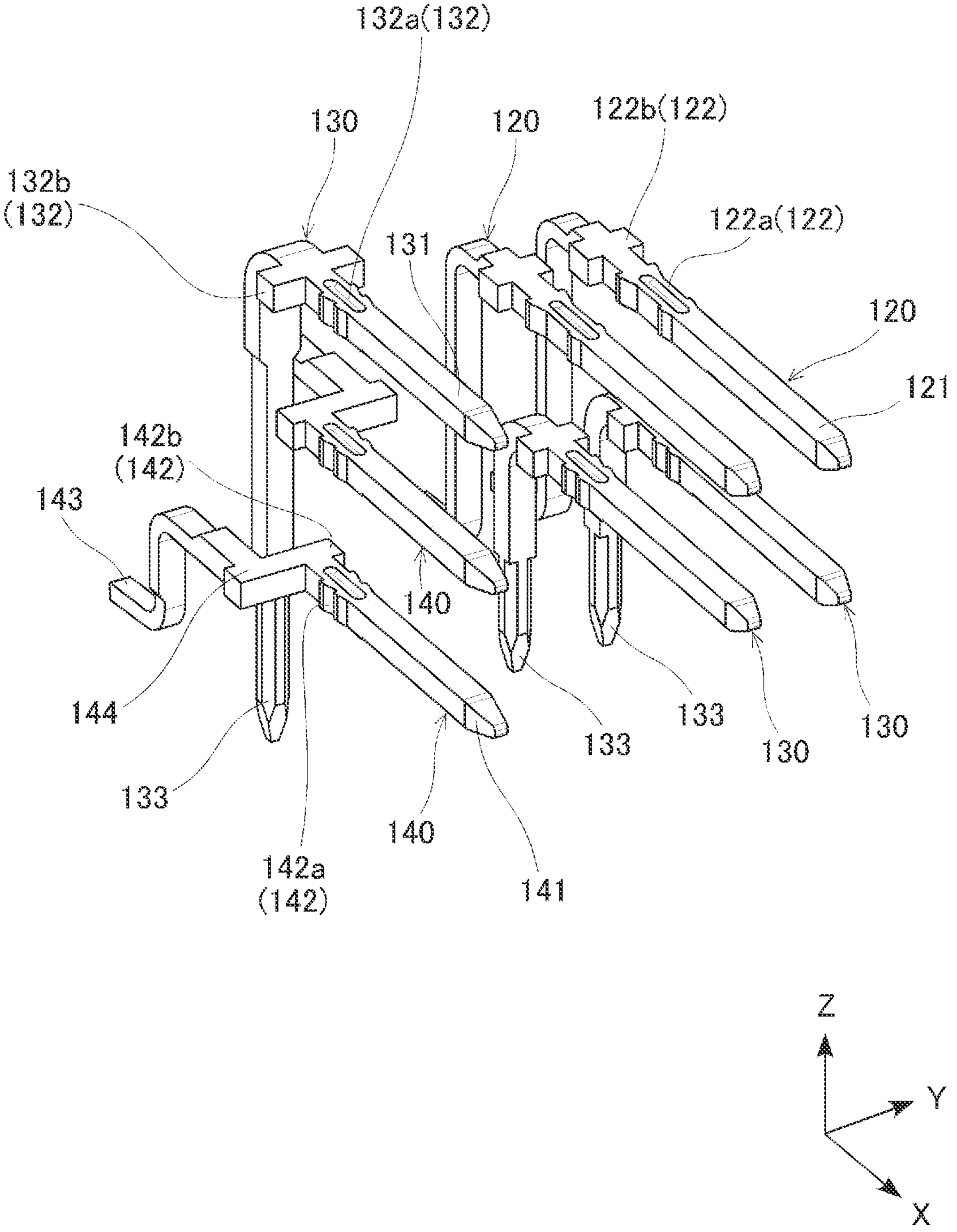
FIG. 25 is a perspective view of a plurality of terminals included in the connector of the example when viewed from the upper left side of the front surface thereof.
Figure 26:
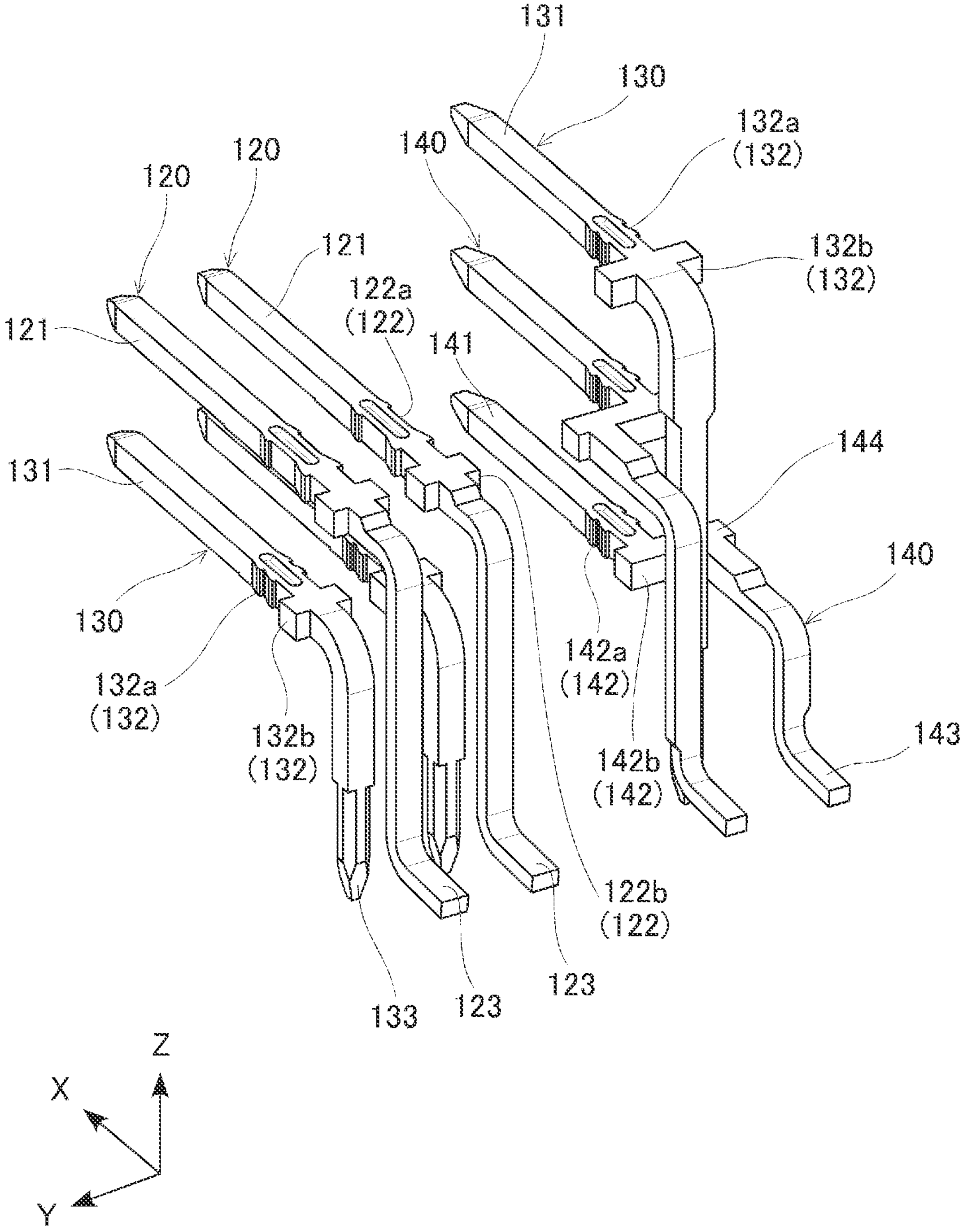
FIG. 26 is a perspective view of the plurality of terminals included in the connector of the example when viewed from the upper right side of the back surface thereof.
Figure 27:
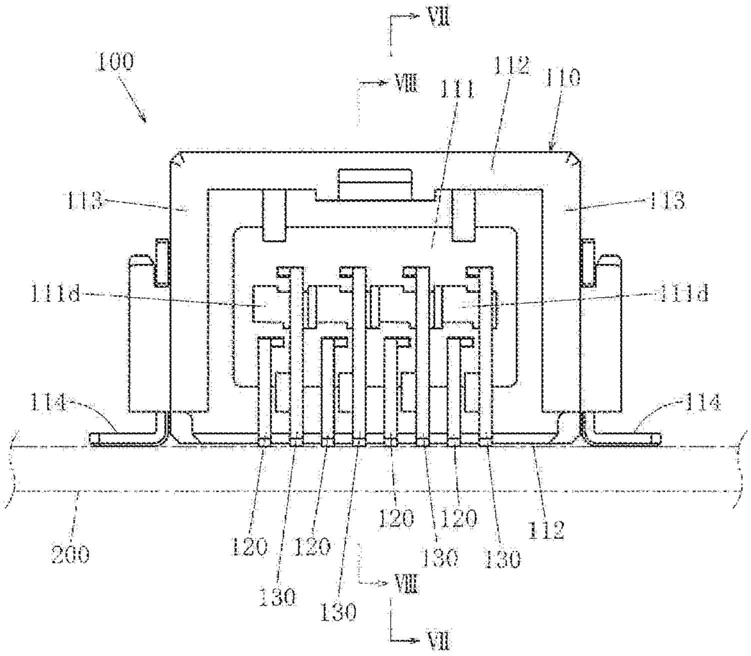
Fig. 27 Prior Art
FIG. 27 is a rear view of a surface mount type connector according to the invention of Patent Literature 1.

As shown in FIGS. 25 and 26, the surface mount terminal 120 of the present example is a member which has a substantially crank-shape as an overall appearance shape and is obtained by bending a rod-shaped metal member by 90 degrees in opposite directions (vertical and horizontal directions) at two places. A portion of the surface mount terminal 120 which extends forward is configured as a terminal portion 121, and is used for electrical connection with a mating connector (not shown). The terminal portion 121 is a portion to be arranged inside the opening of the housing 110 when the surface mount terminal 120 is inserted from the rear side to the front side of the housing 110.

Further, the surface mount terminal 120 of the present example has a fixed portion 122 as a portion to be fixedly connected to the housing 110 when the surface mount terminal 120 is inserted from the rear side to the front side of the housing 110. The fixed portion 122 of the present example is configured as a rod-shaped member extending in the X-direction which is the first direction. Further, in order to perform sure fix-connection with the housing 110, a concavo-convex shape portion 122*a* having an uneven shape is formed on the surface shape of the fixed portion 122, and a flange portion 122*b* formed of a flange-shaped portion is provided to the surface shape of the fixed portion 122. The concavo-convex shape portion 122*a* improves the frictional force for fixing to the housing 110, and the flange portion 122*b* reinforces and positions for the fixing to the housing 110.

Further, the surface mount terminal 120 of the present example has a mount portion 123 extending in a direction parallel to a mount surface of the board 10 which has the mount surface parallel to the XY plane on the rear side thereof. The mount portion 123 is a portion to be soldered to the electrically conductive pad portion 11 formed on the mount surface of the board 10. As a method of soldering the mount portion 123 and the pad portion 11, for example, cream solder is printed in advance at the positions of the pad portions 11, and the connector 700 and the board 10 are put into a reflow furnace while the connector 700 is placed on the board 10 so that the mount portions 123 are in contact with the pad portions 11. The cream solder is melted by heating in the reflow furnace, so that the solder-joint between the mount portions 123 and the pad portions 11 can be completed.

As shown in FIGS. 25 and 26, the through-hole terminal 130 of the present example is a member which has a substantially L-shape as an overall appearance shape and is obtained by bending a rod-shaped metal member by 90 degrees in the vertical direction at one place. The through-hole terminal 130 includes a terminal portion 131 to be arranged inside the housing 110, a fixed portion 132 to be fixed to the housing 110, and a mount portion 133 to be soldered to a through-hole 12 formed on the mount surface of the board 10 in a state where the mount portion 133 is electrically connectable to the through-hole 12.

The fixed portion 132 of the through-hole terminal 130 of the present example is configured as a rod-shaped member extending in the X-direction which is the first direction. Further, in order to perform sure fix-connection with the housing 110, a concavo-convex shape portion 132*a* having an uneven shape is formed on the surface shape of the fixed portion 132, and a flange portion 132*b* formed of a flange-shaped portion is provided to the surface shape of the fixed portion 132. The concavo-convex shape portion 132*a* improves the frictional force for fixing to the housing 110, and the flange portion 132*b* reinforces and positions for the fixing to the housing 110.

As a method of soldering the mount portions 133 of the through-hole terminals 130 to the through-holes 12 according to the present example, for example, cream solder is applied to the positions of the through-holes 12 in advance, the connector 700 and the board 10 are put into the reflow furnace in a state where the connector 700 is arranged on the board 10 so that the mount portions 133 is electrically connectable to the through-holes 12, and the cream solder is molten by heating in the reflow furnace, whereby the soldering joint between the mount portions 133 and the through-holes 12 can be completed.

Figure 23:
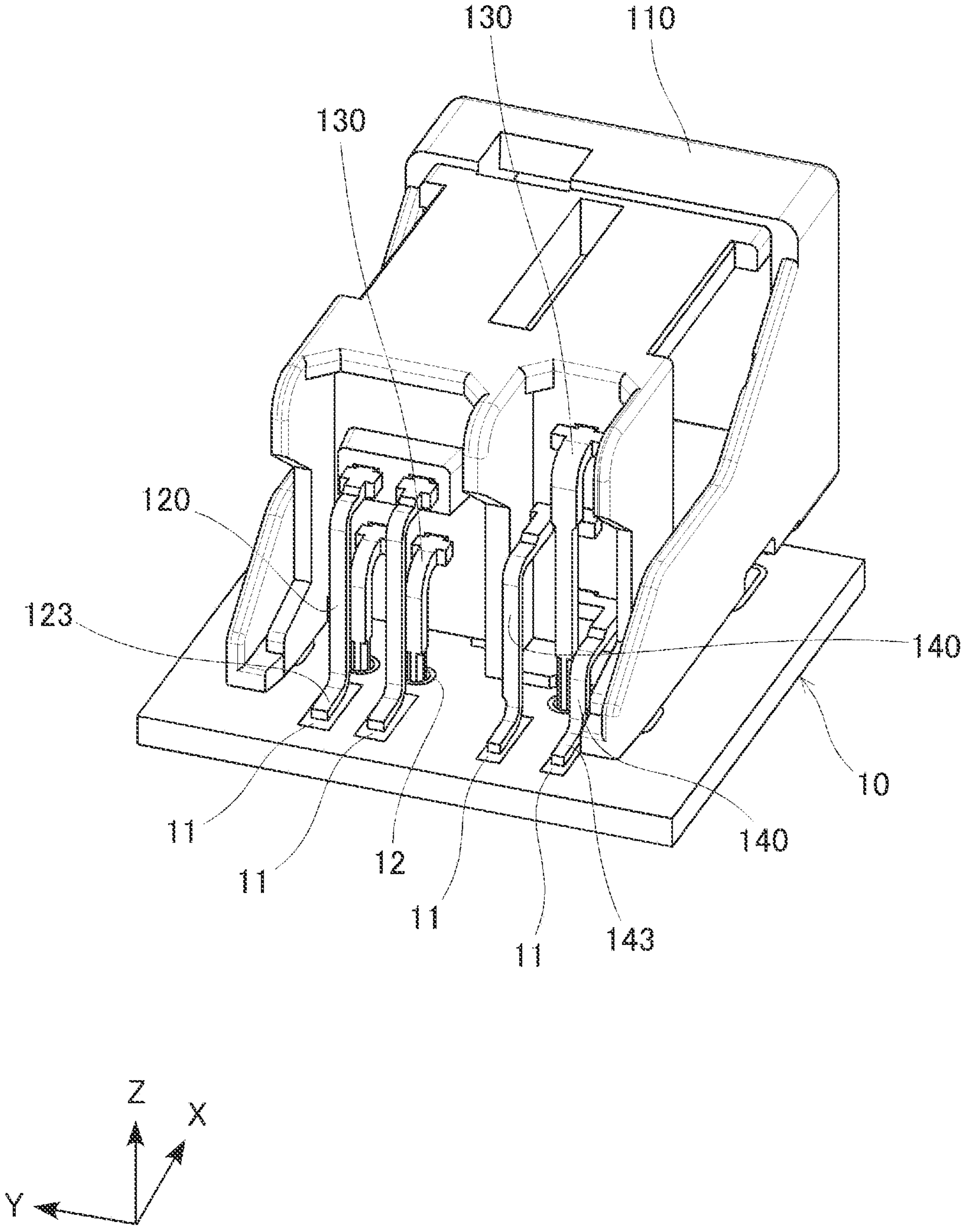
FIG. 23 is a perspective view of the connector of the example when viewed from the upper left side of the back surface thereof with some members (cover shell) being removed from the connector of the example.

Further, in the present example, there is a surface mount terminal 140 whose fixed portion 142 is located just under the fixed portion 132 of the through-hole terminal 130. With respect to this surface mount terminal 140, as shown in FIGS. 25 and 26, a crank portion 144 which is bent so as to be cranked in the horizontal direction is provided between the fixed portion 142 and the mount portion 143 of this surface mount terminal 140. By providing the crank portion 144 to the surface mount terminal 140, the surface mount terminal 140 is arranged so as to avoid the through-hole terminal 130, and the mount portion 143 of the surface mount terminal 140 is soldered to the pad portion 11 of the board 10 at a position which is farther away from the housing 110 than the mount portion 133 of the through-hole terminal 130, so that the degree of freedom in the arrangement of the terminal portions in the connector of the present invention is enhanced (particularly, see FIG. 23). Further, as shown in FIG. 23, by adopting the surface mount terminal 140 provided with the crank portion 144, the fixed portion 142 of the surface mount terminal 140 located just under the through-hole terminal 130 at the highest position is located on the outside of the through-hole terminal 130 (on the rear side far from the housing 110), which makes it possible to guide the mount portion 143 of the surface mount terminal 140 to the outside, so that an effect of facilitating a visual inspection can be obtained.

As shown in FIGS. 25 and 26, with respect to the fixed portion 142 of the surface mount terminal 140 of the present example, as in the case of the surface mount terminal 120 and the through-hole terminal 130, a concavo-convex shape portion 142*a* having an uneven shape is also formed on the surface shape of the fixed portion 142 for sure fix-connection with the housing 110, and a flange portion 142*b* formed of a flange-shaped portion is provided to the surface shape of the fixed portion 142. The concavo-convex shape portion 142*a* improves the frictional force for fixing to the housing

110, and the flange portion 142*b* performs reinforcement of the fixing to the housing 110 and positioning.

Figure 24:
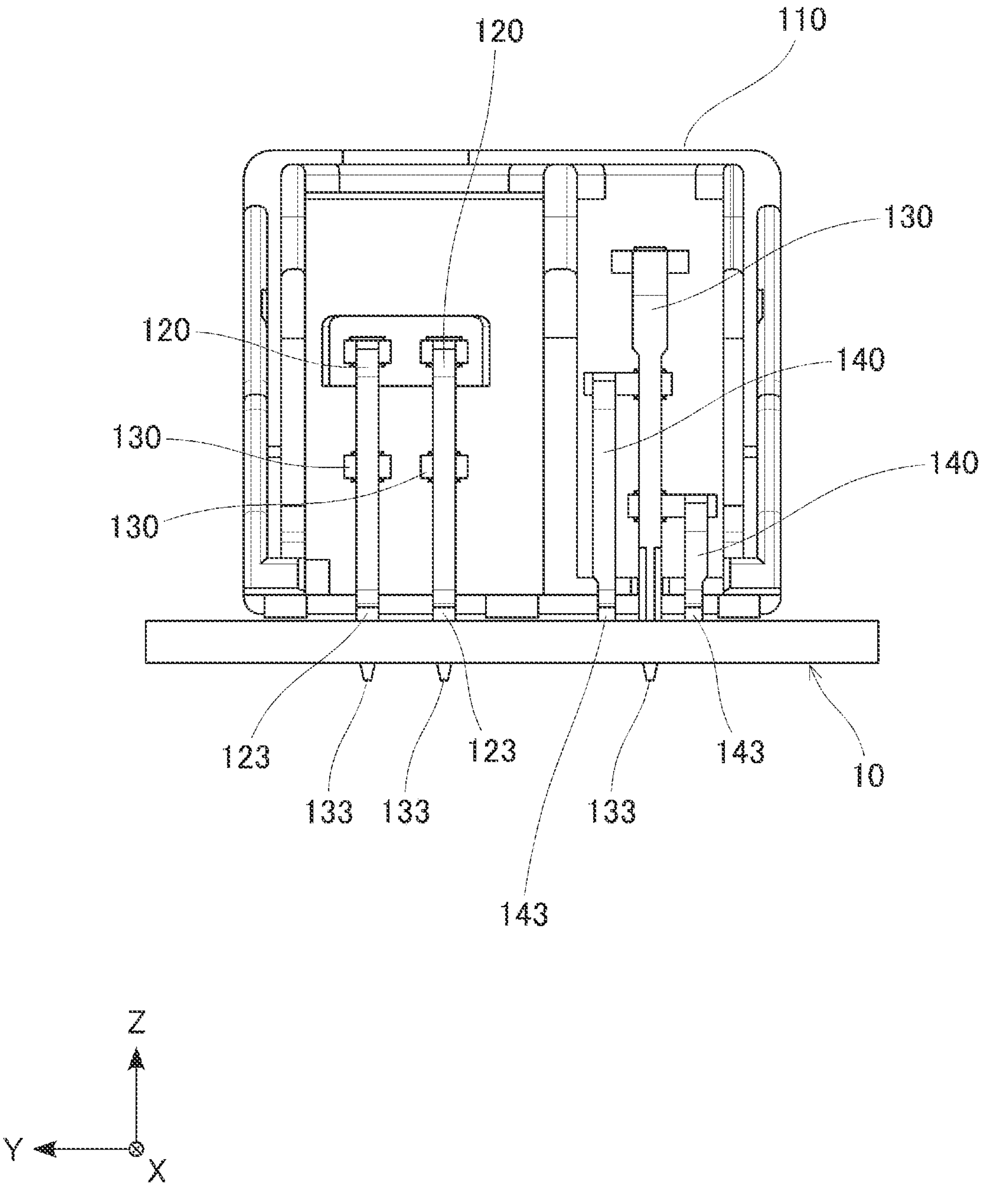
FIG. 24 is a rear view of the connector of the example when viewed from the back side thereof with some members (cover shell) being removed from the connector of the example.

As shown in FIG. 24, the two surface mount terminals 120 and the two surface mount terminals 140 out of the seven terminals included in the connector 700 of the present example are arranged side by side from the left side surface side to the right side surface side in the second direction when the connector 700 mounted on the mount surface of the board 10 is viewed from the rear side thereof along the first direction. Further, in the present example, the connector 700 is configured so that the surface mount terminal 140 having the smallest length dimension from the mount portion 123 to the fixed portion 122 out of the total four surface mount terminals 120 and 140 is arranged at the outermost end on the left side surface side (that is, the leftmost end and the rightmost end on the paper surface in FIG. 24) in the second direction, and the length dimension from the mount portion 123 to the fixed portion 122 is larger or the same dimension according to the arrangement order from the left side surface side to the right side surface side in the second direction.

Further, the terminals other than the total four surface mount terminals 120 and 140 out of the seven terminals of the connector 700 of the present example are configured as through-hole terminals 130, and particularly, in the present example, the connector 700 is configured so that the terminal having the largest length dimension from the mount portion 123, 133, 143 to the fixed portion 122, 132, 142 (the second terminal from the rightmost side on the paper surface in FIG. 24) among the plurality of terminals constituted by the plurality of surface mount terminals 120 and 140 and the plurality of through-hole terminals 130 is set as the through-hole terminal 130.

Here, lift-up depending on the heights of the fixed portions 122 and 142 occurs in the mount portions 123 and 143 of the surface mount terminals 120 and 140 in the reflow soldering process, and the coplanarity is deteriorated. However, the posture of the connector 700 tends to tilt due to vibration during the reflow soldering process and the surface tension of the molten solder because the coplanarity is deteriorated. It has been clarified by inventors' studies that when the posture of the connector 700 tilts, the mount portion 123, 143 of the surface mount terminal 120, 140 whose fixed portion 122, 142 is located at the lowest height serves as a fulcrum (a rotation center when tilting).

The conventional connector structure disclosed in the above-mentioned Patent Literature 1 is verified based on the knowledge as described above. Here, when a plurality of surface mount terminals 120 and 140 having different length dimensions from the mount portions 123 and 143 to the fixed portions 122 and 142 are arranged in a staggered manner, as the length dimension from the mount portion 123, 143 to the fixed portion 122, 142 is larger, the expanding length dimension increases due to the thermal effect during the reflow soldering process, and the positions of the mount portions 123 and 143 of the plurality of surface mount terminals 120 and 140 change depending on the length dimension from the mount portion 123, 143 to the fixed portion 122, 142, so that the soldering failure caused by the deterioration of coplanarity is likely to occur.

Further, unlike the connector 700 of the present example as shown in FIG. 24, when the surface mount terminal 120, 140 serving as a fulcrum is not arranged at the outermost end on one side in the arrangement direction (for example, an outside such as the leftmost end or the rightmost end), the positions of the mount portions 123 and 143 of the surface mount terminals 120 and 140 on one side of the fulcrum lower, whereas the positions of the mount portions 123 and 143 of the surface mount terminals 120 and 140 on the other side of the fulcrum rise (get away from molten solder). Therefore, soldering failure is likely to occur at the surface mount terminals 120 and 140 on the other side of the fulcrum.

However, in the connector 700 of the present example, as shown in FIG. 24, since the surface mount terminal 140 serving as a fulcrum is arranged at the leftmost end (outside) on the left side surface side in the arrangement direction, the tilt of the posture of the connector 700 causes the positions of the mount portions 123 and 143 of all the surface mount terminals 120 and 140 to shift downward (in the direction approaching the molten solder), so that the occurrence of soldering failure is suppressed. In other words, as shown in FIG. 24, the connector 700 of the present example is configured so that the surface mount terminal 140 having the smallest length dimension from the mount portion 123, 143 to the fixed portion 122, 142 out of the total four surface mount terminals 120 and 140 is located at the leftmost end on the left side surface side (the right end on the paper surface in FIG. 24), and the length dimension from the mount portion 123, 143 to the fixed portion 122, 142 is larger or the same dimension according to the arrangement order from the left side surface side to the right side surface side. Therefore, the deterioration of coplanarity can be minimized, and the connector 700 in which soldering failure is unlikely to occur is achieved. These effects have been confirmed through simulations and empirical studies by the inventors.

The preferred embodiments of the present invention have been described above, but the technical scope of the present invention is not limited to the scope described in the above embodiments. Various changes or improvements can be made to the above embodiments.

For example, in the above-described example and the like, the example in which the surface mount terminal 120, 140 which have the smallest length dimension from the mount portion 123, 143 to the fixed portion 122, 142 among the plurality of surface mount terminals 120 and 140 and serves as a fulcrum in the reflow soldering process is arranged at the leftmost end on the left side surface side is illustrated. However, in the present invention, the plurality of surface mount terminals 120 and 140 may be configured to be arranged so that the surface mount terminal 120, 140 serving as a fulcrum is arranged at the rightmost end (outside) on the right side surface side in the arrangement direction, and the length dimension from the mount portion 123, 143 to the fixed portion 122, 142 is larger or the same dimension according to the arrangement order from the right side surface side to the left side surface side. Even when the configuration as described above is adopted, the same action and effect as the above-described example and the like can be achieved.

From recitations of the claims, it is clear that modes in which the changes or improvements as described above are applied may be included in the technical scope of the present invention.

REFERENCE SIGNS LIST

10 board
11 pad portion
12 Through-hole
13 mount hole
100 connector (of first embodiment)
110 housing

112 cover shell
112*a* side surface
112*b* top surface
112*c* back surface
113 leg portion
120 surface mount terminal (terminal)
121 terminal portion
122 fixed portion
122*a* concavo-convex shape portion
122*b* flange portion
123 mount portion
130 through-hole terminal (terminal)
131 terminal portion
132 fixed portion
132*a* concavo-convex shape portion
132*b* flange portion
133 mount portion
140 surface mount terminal (terminal)
141 terminal portion
142 fixed portion
142*a* concavo-convex shape portion
142*b* flange portion
143 mount portion
144 crank portion
200 connector (of second embodiment)
300 connector (of third embodiment)
400 connector (of fourth embodiment)
500 connector (of fifth embodiment)
600 connector (of sixth embodiment)
700 connector (of the present example)

What is claimed is:

1. A connector comprising:

a housing formed of resin; and a plurality of terminals formed of metal and installed in the housing, the connector being mounted on a mount surface of a board parallel to a plane defined by a first direction and a second direction which are orthogonal to each other, wherein at least some of the plurality of terminals are formed as a plurality of surface mount terminals, and each of the plurality of mount terminals includes a terminal portion arranged inside the housing, a fixed portion fixed to the housing, and a mount portion soldered to an electrically conductive pad portion formed on the mount surface of the board, wherein the plurality of surface mount terminals is arranged from one side to the other side in the second direction when the connector mounted on the mount surface of the board is viewed in the first direction, a surface mount terminal having a smallest length dimension from the mount portion to the fixed portion among the plurality of surface mount terminals is arranged at an outermost end on the one side in the second direction, and a length dimension from the mount portion to the fixed portion becomes larger or is the same in order of an arrangement of the plurality of surface mount terminals from the one side to the other side in the second direction, wherein the plurality of surface mount terminals is arranged so that the arrangement of the plurality of surface mount terminals arranged side by side from the one side to the other side in the second direction forms at least two rows when the mount surface of the board is viewed in a third direction orthogonal to the first direction and the second direction, and wherein the surface mount terminal having the smallest length dimension from the mount portion to the fixed portion in each of the at least two rows is arranged at the outermost end on the one side in the second direction, and surface mount terminals in the at least two rows arranged at the outermost end on the one side in the second direction are arranged at positions which overlap each other when the connector mounted on the mount surface of the board is viewed in the first direction.

2. The connector according to claim 1, wherein the plurality of terminals includes through-hole terminals, each of the through-hole terminals comprises another terminal portion arranged inside the housing, another fixed portion fixed to the housing, and another mount portion soldered in a state where the another mount portion is electrically connected to a through-hole formed on the mount surface of the board, and terminals each having a largest length dimension from the mount portion to the fixed portion among the plurality of terminals are the through-hole terminals.

3. The connector according to claim 2, wherein a surface mount terminal having the fixed portion located just under the fixed portion of each of the through-hole terminals is provided with a crank portion bent in a crank shape between the fixed portion and the mount portion of the surface mount terminal having the fixed portion located just under the fixed portion of each of the through-hole terminals, whereby the mount portion of the surface mount terminal thereof is soldered to the electrically conductive pad portion of the board at a position which is farther away from the housing than the another mount portion of each of the through-hole terminals.

4. A connector comprising:

a housing formed of resin; and a plurality of terminals formed of metal and installed in the housing, the connector being mounted on a mount surface of a board parallel to a plane defined by a first direction and a second direction which are orthogonal to each other, wherein at least some of the plurality of terminals are formed as a plurality of surface mount terminals, and each of the plurality of mount terminals includes a terminal portion arranged inside the housing, a fixed portion fixed to the housing, and a mount portion soldered to an electrically conductive pad portion formed on the mount surface of the board, wherein the plurality of surface mount terminals is arranged from one side to the other side in the second direction when the connector mounted on the mount surface of the board is viewed in the first direction, a surface mount terminal having a smallest length dimension from the mount portion to the fixed portion among the plurality of surface mount terminals is arranged at an outermost end on the one side in the second direction, and a length dimension from the mount portion to the fixed portion becomes larger or is the same in order of an arrangement of the plurality of surface mount terminals from the one side to the other side in the second direction, wherein the plurality of terminals includes through-hole terminals, and wherein a surface mount terminal having the fixed portion located just under the fixed portion of each of the through-hole terminals is provided with a crank portion bent in a crank shape between the fixed portion and the mount portion of the surface mount terminal having the fixed portion located just under the fixed portion of each of the through-hole terminals, whereby the mount portion of the surface mount terminal thereof is soldered to the electrically conductive pad portion of the board at a position which is farther away from the housing than the another mount portion of each of the through-hole terminals.

5. The connector according to claim 4, wherein, wherein the plurality of surface mount terminals is arranged so that the arrangement of the plurality of surface mount terminals arranged side by side from the one side to the other side in the second direction forms at least two rows when the mount surface of the board is viewed in a third direction orthogonal to the first direction and the second direction, and wherein the surface mount terminal having the smallest length dimension from the mount portion to the fixed portion in each of the at least two rows is arranged at the outermost end on the one side in the second direction, and surface mount terminals in the at least two rows arranged at the outermost end on the one side in the second direction are arranged at positions which overlap each other when the connector mounted on the mount surface of the board is viewed in the first direction.

6. The connector according to claim 4, wherein each of the through-hole terminals comprises another terminal portion arranged inside the housing, another fixed portion fixed to the housing, and another mount portion soldered in a state where the another mount portion is electrically connected to a through-hole formed on the mount surface of the board, and terminals each having a largest length dimension from the mount portion to the fixed portion among the plurality of terminals are the through-hole terminals.

7. The connector according to claim 5, wherein each of the through-hole terminals comprises another terminal portion arranged inside the housing, another fixed portion fixed to the housing, and another mount portion soldered in a state where the another mount portion is electrically connected to a through-hole formed on the mount surface of the board, and terminals each having a largest length dimension from the mount portion to the fixed portion among the plurality of terminals are the through-hole terminals.

* * * * *